United States Patent
Zhang et al.

(10) Patent No.: US 10,173,822 B2
(45) Date of Patent: *Jan. 8, 2019

(54) AIR BAG PACKAGING ARRANGEMENT AND SELF-ADHESIVE CHECKING VALVE

(71) Applicants: Jiaying Zhang, Shanghai (CN); Huiping Nie, Shanghai (CN)

(72) Inventors: Jiaying Zhang, Shanghai (CN); Huiping Nie, Shanghai (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/632,283

(22) Filed: Jun. 23, 2017

(65) Prior Publication Data
US 2017/0291750 A1 Oct. 12, 2017

Related U.S. Application Data

(63) Continuation of application No. 14/920,889, filed on Oct. 23, 2015, now Pat. No. 9,725,066, which is a
(Continued)

(51) Int. Cl.
*B65D 81/05* (2006.01)
*B65D 81/02* (2006.01)
(Continued)

(52) U.S. Cl.
CPC ......... *B65D 81/052* (2013.01); *B29D 22/003* (2013.01); *B29D 22/02* (2013.01); *B32B 1/00* (2013.01); *B32B 3/04* (2013.01); *B32B 7/045* (2013.01); *B32B 7/12* (2013.01); *B32B 27/08* (2013.01); *B32B 27/302* (2013.01); *B32B 27/304* (2013.01); *B32B 27/306* (2013.01); *B32B 27/32* (2013.01); *B32B 27/36* (2013.01); *B32B 37/0076* (2013.01); *B60R 21/26* (2013.01); *B65B 31/00* (2013.01); *B65B 51/10* (2013.01); *B65D 81/022* (2013.01);
(Continued)

(58) Field of Classification Search
CPC ...... B29C 65/00; B29D 22/00; B29D 22/003; B29D 22/02; B32B 1/00; B32B 3/02; B32B 3/04; B60R 21/26; B60R 2021/26094; B65B 31/00; B65B 51/10; B65D 81/02; B65D 81/022; B65D 81/05; B65D 81/052; F16K 15/147; F16K 15/20; F16K 15/202
USPC ....................... 206/522; 137/223–225; 383/3
See application file for complete search history.

(56) References Cited

U.S. PATENT DOCUMENTS 7,165,677 B2 * 1/2007 Tanaka .................. B65D 81/052
206/522
7,445,117 B2 * 11/2008 Kojima ................. B65D 81/052
206/522
(Continued)

*Primary Examiner* — Bryon Gehman
(74) *Attorney, Agent, or Firm* — Raymond Y. Chan; David and Raymond Patent Firm

(57) ABSTRACT

An air bag packaging arrangement and a self-adhesive checking valve, the air bag packaging arrangement includes an air bag and an air valve which is the self-adhesive checking valve. The air bag includes first and second cell overlapped layers to form an air chamber and a valve opening. The air valve includes first and second sealing films overlapped between the first and second cell layers, and a strengthening film provided between the first valve film and the first cell film to strengthen a joint strength between the first valve film and the first cell film, so as to prevent the first valve film from being broken, so as to further avoid an air leakage.

3 Claims, 19 Drawing Sheets

Related U.S. Application Data continuation-in-part of application No. 13/887,298, filed on May 4, 2013, now Pat. No. 9,199,597, which is a continuation of application No. 13/887,297, filed on May 4, 2013, now Pat. No. 9,199,596.

(51) Int. Cl.

| | | |
|---|---|---|
| *B65B 31/00* | (2006.01) | |
| *B65B 51/10* | (2006.01) | |
| *F16K 15/14* | (2006.01) | |
| *F16K 15/20* | (2006.01) | |
| *B29D 22/02* | (2006.01) | |
| *B60R 21/26* | (2011.01) | |
| *B29D 22/00* | (2006.01) | |
| *B32B 1/00* | (2006.01) | |
| *B32B 7/04* | (2006.01) | |
| *B32B 27/08* | (2006.01) | |
| *B32B 27/30* | (2006.01) | |
| *B32B 27/32* | (2006.01) | |
| *B32B 27/36* | (2006.01) | |
| *B32B 3/04* | (2006.01) | |
| *B32B 37/00* | (2006.01) | |
| *B32B 7/12* | (2006.01) | |
| *B32B 3/02* | (2006.01) | |

(52) U.S. Cl.
CPC .......... *F16K 15/147* (2013.01); *F16K 15/202* (2013.01); *B32B 3/02* (2013.01); *B32B 2250/05* (2013.01); *B32B 2250/246* (2013.01); *B32B 2250/44* (2013.01); *B32B 2255/24* (2013.01); *B32B 2270/00* (2013.01); *B32B 2307/306* (2013.01); *B32B 2307/31* (2013.01); *B32B 2307/546* (2013.01); *B32B 2307/56* (2013.01); *B32B 2307/732* (2013.01); *B32B 2553/02* (2013.01); *B32B 2553/026* (2013.01); *B60R 2021/26094* (2013.01); *Y10T 137/36* (2015.04)

(56) References Cited

U.S. PATENT DOCUMENTS

| | | | |
|---|---|---|---|
| 7,533,772 B2* | 5/2009 | Yoshifusa | B65D 81/052 206/522 |
| 7,584,848 B2* | 9/2009 | Yoshifusa | B65D 81/052 206/522 |
| 7,708,464 B2* | 5/2010 | Tanaka | B65D 31/14 206/524.8 |
| 7,913,848 B2* | 3/2011 | Liao | F16K 15/147 206/522 |
| 7,959,003 B2* | 6/2011 | Liao | B65D 81/052 206/522 |
| 8,419,278 B2* | 4/2013 | Tanaka | B65D 81/052 206/522 |
| 2007/0051656 A1* | 3/2007 | Hsin | B65D 81/052 206/522 |
| 2009/0239006 A1* | 9/2009 | Liao | B65D 81/052 428/34.1 |

* cited by examiner

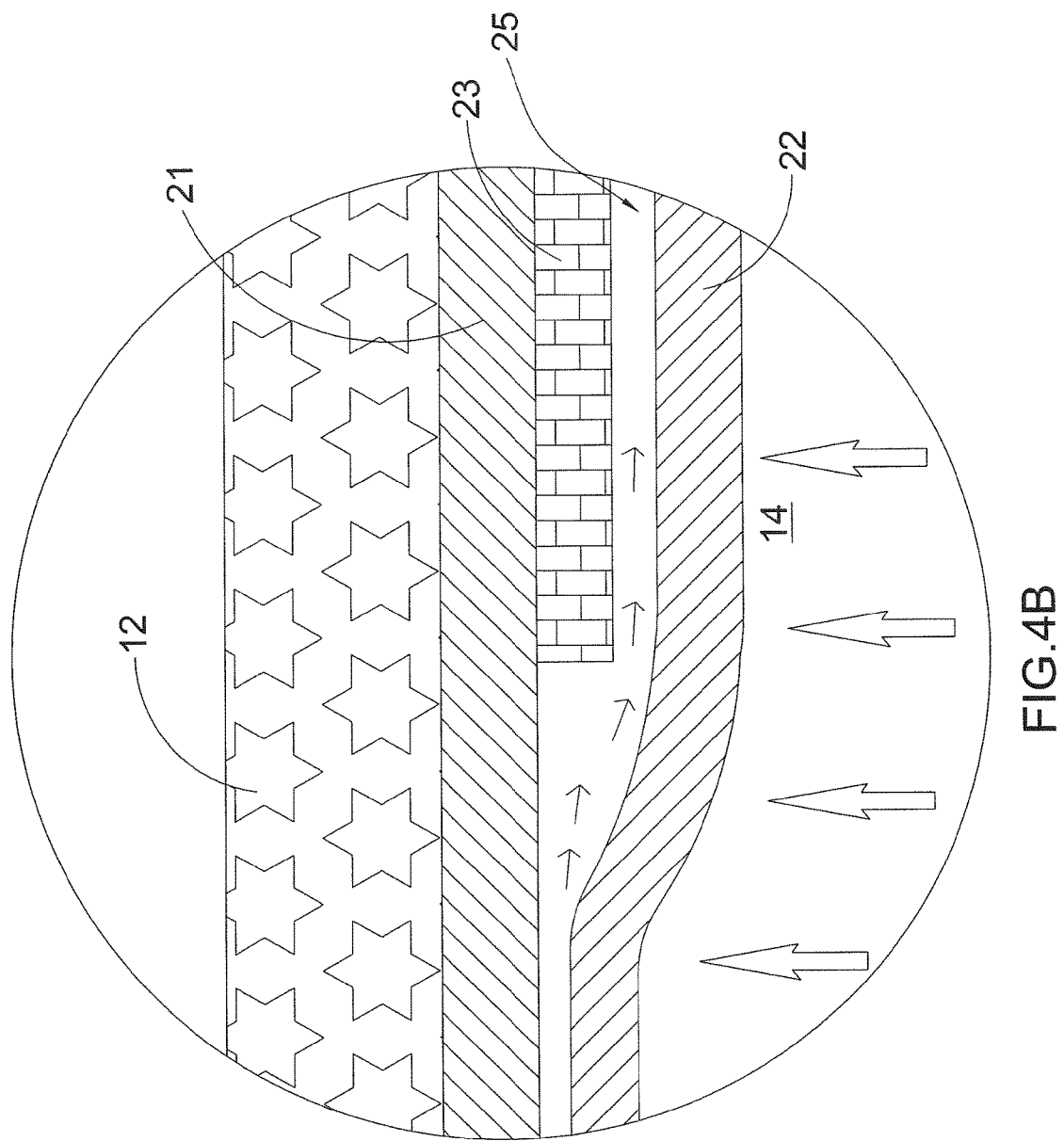

A-A

A-A

B-B

A-A

A

US 10,173,822 B2

AIR BAG PACKAGING ARRANGEMENT AND SELF-ADHESIVE CHECKING VALVE

CROSS REFERENCE OF RELATED APPLICATION

This application is a Continuation application that claims the benefit of priority under 35 U.S.C. § 120 to a non-provisional application, application Ser. No. 14/920,889, filed on Oct. 23, 2015, which is a Continuation-In-Part application that claims the benefit of priority under 35 U.S.C. § 120 to a non-provisional application, application Ser. No. 13/887,298, filed on May 4, 2013, which is a Continuation application that claims the benefit of priority under 35 U.S.C. § 120 to a non-provisional application, application Ser. No. 13/887,297, filed May 4, 2013, wherein the entire content of which are expressly incorporated herein by reference.

BACKGROUND OF THE PRESENT INVENTION

Field of Invention

The present invention relates to a packing product, and more particular to an air bag packing arrangement, which comprises an air bag and an air valve for air-sealing the air bag after the air bag is inflated. The present invention also relates to a self-adhesive checking valve, and more particularly to a self-adhesive checking valve having a backflow prevention channel adapted for self-adhesiving to prevent air leakage. The present invention also relates to the usage of the self-adhesive checking valve in air bag packaging arrangement.

Description of Related Arts

Air cushioning product, such as "Bubble Wrap", is excellent for packaging because it provides a cushioning effect but also water resistant for an item to be packed. However, the "bubble wrap" is too thin to provide enough cushioning effect for a relatively larger item. An improved air cushioning product is provided as an air bag having an air valve, wherein the air bag is inflated via the air valve to enhance the air cushioning effect. The air valve, such as check valve, stop valve, and safety valve, has a predetermined structure for preventing air leakage of the air bag. However, the air seal configuration of the air valve is complicated and cannot enduringly retain the air within the air bag.

FIG. 6 illustrates an air bag with a conventional air valve, wherein the air bag comprises two bag layers 1, 2 overlapped with each other to define an opening. The air valve comprises two valve layers 3, 4 overlappedly affixed between the bag layers 1, 2 at the opening so as to form a four-layered configuration. Accordingly, when the air bag is inflated, the valve layers 3, 4 are bonded to seal at the opening of the air bag so as to seal the air within the air bag. In particular, the first valve layer 3 is overlappedly bonded to the first bag layer 1 while the second valve layer 4 is overlappedly bonded to the second bag layer 2. When inflating the air bag, air is guided to pass through a channel between the first and second valve layers 3, 4. Once the air bag is inflated completely, the valve layers 3, 4 are bonded together to close and seal the opening of the air bag. In addition, the air pressure within the air bag will exert at the valve layers 3, 4 to ensure the valve layers 3, 4 being bonded together so as to prevent air being leaked through the air valve. In addition, the air valve is a one-way air valve only allowing air entering into the air bag. However, since the valve layers 3, 4 are self-adhered together to provide the sealing effect, the air will be gradually leaked through the channel after a period of use, especially when the air bag is compressed continuously.

The inflatable air bag packaging arrangements have good air cushioning effect for air is able to be filled to the inflatable air bag packaging arrangements. Furthermore, the inflatable air bag packaging arrangements can be transported in an un-inflated position, so as to occupy a smaller space. One can inflate to the air bag packaging arrangements when he/she would use them, so as to decrease the cost of transporting and storage. This kind of air bag packaging arrangement is very popular in the market.

FIGS. 12 and 13 of the drawings illustrate the structure of the air bag packaging arrangement according to a prior art, wherein the air bag packaging arrangement comprises two outer films 1A and 1B which are heat-sealed together, and two shorter inner films 2A and 2B, wherein a plurality of inflating channels 2C is formed between the two inner films 2A and 2B and the inflating channels 2C will be closed automatically after the inflating is finished, wherein the air bag packaging arrangement forms a plurality of inflatable air cell 1C via heat-sealing the two outer films 1A and 1B. The two outer films 1A and 1B are then heat-sealed and folded to make the inflating structure to form various shapes, so as to be used to contain the packaging items or be used as filling materials, so as to provide an air cushioning effect for the packaging items.

According to the prior art, the air valve is formed by two inner films 2A and 2B form, as shown in FIG. 13, at the air inlet end, the inner film 2A and the outer film 1A are heat-sealed together, wherein the inner film 2B and the outer film 1B are heat-sealed together, wherein the inflating channel 2C is formed between the two inner films 2A and 2B for there is no heat-resisting arrangement is provided between. While inflating, air enters into the inflating channel 2C through a main air channel 1D and then enters into the relative inflatable air cell 1C from the inflating channel 2C. when the air pressure in the inflatable air cell 1C reach a predetermined value, the air in the air cell 1C will press the inner films 2A and 2B to the outer film 1A, so that the inner films 2A and 2B attach to a same outer film 1C to realize a self-sealing effect, so as to prevent the air in the inflatable air cell 1C from leaking.

However, the structure of air valve according to the prior art has a risk of air leakage. In detail, at the air entering end, the inner film 2B and the outer film 1B are connected together via the heat-sealing manner. The heat melting manner makes the inner film 2B and the outer film 1B be harden and frangible at the position where the heat-sealing being applied, so the connection between the inner film 2B and the outer film 1B is weak, wherein when the air pressure in the inflatable air cell 1C is large enough, air will enter into the space between the inner film 2B and the outer film 1B and open the joint between the inner film 2B and the outer film 1B, i. e. the sealing connecting joint of the inner film 2B and the outer film 1B has the danger of being broken, which results in that the whole air packaging arrangement cannot keep its pressure and lose the air cushioning effect.

In other words, in the structure of the above air valve, due to the pressure to the inner film 2B from the air, the three films 1A, 2A and 2B closely attach together, so the air will not easily leak out from the space between the two inner films 2A and 2B or the space between the inner film 2A and the outer film 1A. However, the air leaking may easily occur between the inner film 2B and the outer film 1B due to the breaking of the joint connection therebetween during heat-melting, and the air bag packaging arrangement will be scrapped.

SUMMARY OF THE PRESENT INVENTION

The invention is advantageous in that it provides an air bag packaging arrangement, wherein the air valve is a double non-return valve to provide double sealing effects of the air bag after the air bag is inflated.

Another advantage of the invention is to provide an air bag packaging arrangement, wherein the air inflating channel is sealed and closed by the two sealing films as the first sealing effect and is further sealed and closed by the check sealing film as the second sealing effect, so as to prevent any air leakage of the air bag.

Another advantage of the invention is to provide an air bag packaging arrangement, wherein in case of air leakage, the air is guided to flow to a backflow prevention channel for creating a supplemental air pressure to further seal and close the air inflating channel, so as to make up a deficient sealing effect of the sealing films.

Another advantage of the invention is to provide an air bag packaging arrangement, wherein the air leaked from the air chamber of the air bag will be filled into the backflow prevention channel to further seal and close the air inflating channel. Therefore, when the air pressure at the air chamber is reduced, the air pressure at the backflow prevention channel will be increased. In other words, the air pressure within the air bag will remain the same to provide the same air cushioning effect even the air chamber is leaked. Accordingly, the more the air leaked from the air chamber, the better the sealing effect of the check sealing film forms.

Another advantage of the invention is to provide an air bag packaging arrangement, which is adapted for incorporating with any pumping device to input the compressed air into the air bag via the air valve.

Another advantage of the invention is to provide an air bag packaging arrangement, which does not require altering the original structure of the air bag so as to reduce the manufacturing cost of the air bag with built-in air valve.

Another advantage of the invention is to provide an air bag packaging arrangement, wherein no expensive or mechanical structure is required to employ in the present invention in order to achieve the above mentioned objects. Therefore, the present invention successfully provides an economic and efficient solution not only for providing a double air-sealing configuration of the air bag but also for enhancing the practice use of the air bag.

Another advantage of the invention is to provide a self-adhesive checking valve and an air bag packaging arrangement with the self-adhesive checking valve, wherein the self-adhesive checking valve allows fluid such as air to flow therethrough and provides a backflow prevention channel for self-adhesion of the valve so as to prevent leakage of the fluid, so that life span of the air bag packaging arrangement can be prolonged.

Another advantage of the invention is to provide an air bag packaging arrangement and an air valve of the air bag packaging arrangement, wherein the air bag packaging arrangement comprises two cell films and the air valve, the air valve comprises two valve films which form an air entering channel and an extra strengthening film, wherein the strengthening film is provided between one of the valve films and one of the cell films, so as to prevent the air valve and the cell film being broken.

Another advantage of the invention is to provide an air bag packaging arrangement and an air valve of the air bag packaging arrangement, wherein when the inflating is finished, the two valve films attach to the second cell film to avoid air from leaking, wherein the strengthening film is provided between the first cell film and the first valve film to avoid the connection between the first cell film and the first valve film from being broken.

Another advantage of the invention is to provide an air bag packaging arrangement and an air valve of the air bag packaging arrangement, wherein the strengthening film strengthens the connection between the first cell film and the first valve film, so that when the inflatable unit is filled with air, the air enters into the space between the first cell film and the strengthening film or the space between the strengthening film and the first valve film. Because of both sides of the strengthening film have films being heat-sealed together, the joint between the strengthening film and the two films will not break easily.

Another advantage of the invention is to provide an air bag packaging arrangement and an air valve of the air bag packaging arrangement, wherein the strengthening film distal end and the first valve film are heat-sealed together. Thus, after the inflating is finished, the strengthening film, together with the two valve films, attaches to the second cell film, so as to realize one-way inflating and self-sealing.

Another advantage of the invention is to provide an air bag packaging arrangement and an air valve of the air bag packaging arrangement, wherein the strengthening film is shorter than the first valve film, wherein a strengthening channel is formed between the strengthening film and the first valve film. Thus, even if the air leaks reversely, the air enters into the strengthening channel between the first valve film and the strengthening film, wherein the air further press the first valve film to attach to the second valve film and further strengthen the sealing effect to the air entering channel between the two valve films.

Another advantage of the invention is to provide an air bag packaging arrangement and an air valve of the air bag packaging arrangement, wherein the near end of the strengthening film near to the air entering channel further extend outwardly and form an inflating main channel with the second cell film. Thus, the first cell film does not need to extend to parallel with the second cell film, so as to save the material of the first cell film and further save cost.

Another advantage of the invention is to provide an air bag packaging arrangement and an air valve of the air bag packaging arrangement, wherein it is not like the prior art, according to which, all of the films forming the air valve are provided between the two outer films to form inner film, the strengthening film according to the present invention is not provided fully in the cell film, but can be a film partially exposed to the outer side, so that the present invention provides a different valve and a different air packaging structure.

Another advantage of the invention is to provide an air bag packaging arrangement and an air valve of the air bag packaging arrangement, wherein the air bag packaging arrangement is suitable to be used as air cushioning material, so as to provide air cushioning effect to the supported items or the packaged items via being filled to other packaging items, such as packaging boxes. On the other hand, the air bag packaging arrangement is suitable to store the packaging items directly, so as to provide air cushioning effect around the packaging items, so that the air bag packaging arrangement according to the present invention can be used widely.

Another advantage of the invention is to provide an air bag packaging arrangement and an air valve of the air bag packaging arrangement, wherein the structure and the craftsmanship of the air bag packaging arrangement and the air valve is simple, wherein the cost is low, wherein the air bag packaging arrangement is environmental friendly, the air bag packaging arrangement is suitable to be widely used to modern logistics.

Additional advantages and features of the invention will become apparent from the description which follows, and may be realized by means of the instrumentalities and combinations particular point out in the appended claims.

According to the present invention, the foregoing and other objects and advantages are attained by an air bag packaging arrangement which comprises an air bag and an air valve.

The air bag comprises at least one inflatable air cell, wherein the air cell comprises a first cell layer and a second cell layer overlapped with each other to form an air chamber and a valve opening communicating with the air chamber.

The air valve, which is a double non-return valve, comprises a first sealing film, a second sealing film, and a check sealing film.

The first and second sealing films are overlapped between the first and second cell layers of the air cell and extended from the valve opening of the air cell into the air chamber thereof.

The check sealing film is overlapped between proximal portions of the first and second sealing films to define an air inflating channel between the first sealing film and the check sealing film, and a backflow prevention channel between the check sealing film and the second sealing film, wherein the air inflating channel is arranged for inputting air into the air chamber to inflate the air cell until distal portions of the first and second sealing films are overlapped and sealed to close the air inflating channel by means of air pressure within the air chamber, wherein in case of air leakage between the distal portions of the first and second sealing films, the air within the air chamber is guided to flow to the backflow prevention channel for creating a supplemental air pressure to further seal and close the air inflating channel, so as to make up a deficient sealing effect of the first and second sealing films.

In accordance with another aspect of the invention, the present invention comprises a method of manufacturing an air bag, which comprises the steps of:

(a) making an air cell to have a first cell layer and a second cell layer overlapped with each other to form an air chamber and a valve opening;

(b) placing an air valve between the first and second cell layers to form an air inflating channel for communicating the valve opening with the air chamber, and to form a backflow prevention channel to communicate with the air chamber, wherein an inflating direction of the air inflating channel is opposite to an inputting direction of the backflow prevention channel;

(c) inputting air into the air chamber through the air inflating channel to inflate the air cell so as to seal and close the air inflating channel by means of air pressure within the air chamber; and (d) in case of air leakage, guiding the air within the air chamber to flow to the backflow prevention channel for creating a supplemental air pressure to further seal and close the air inflating channel, so as to prevent the air being leaked from the valve opening.

In accordance with another aspect of the invention, the present invention provides an air bag packaging arrangement, comprising an inflatable body and an air valve. The inflatable body comprises a first cell film and a second cell film, wherein the first cell film and a second cell film overlap with each other, so as to form at least one inflatable unit, wherein each the inflatable unit has an inflatable air chamber. The air valve comprises a first valve film, a second valve film and a strengthening film, wherein the first valve film, the second valve film and the strengthening film overlap with each other, wherein the first valve film, the second valve film, the strengthening film, the first cell film and the second cell film are heat-sealed to form at least one air entering channel between the first valve film and the second valve film, wherein the air entering channel is used to inflate the inflatable air chamber, wherein when an inflating process is finished, the first valve film and the second valve film attach to the second cell film, so as to close the air entering channel, so as to realize a self-sealing effect, wherein the strengthening film is provided between the first valve film and the first cell film to strengthen a joint strength between the first valve film and the first cell film, so as to prevent the first valve film from being broken, so as to further avoid an air leakage.

In accordance with another aspect of the invention, the present invention provides an air valve, which is suitable to inflate an air bag packaging arrangement comprising an inflatable body, wherein the inflatable body comprises at least two cell films overlapping with each other to form at least one inflatable unit, wherein each the inflatable unit has an inflatable air chamber, wherein the air valve comprises two valve films overlapping with each other and a strengthening film, wherein the two valve films, the strengthening film and the two cell films are heat-sealed, so as to form at least one air entering channel between the two valve films, which is used to inflate the inflatable air chamber, wherein after an inflating process is finished, the first and second valve films attach to one of the cell films, so as to close the air entering channel, wherein the strengthening film is provided between the other cell film and one of the valve films.

In accordance with another aspect of the invention, the present invention comprises a manufacturing method of an air bag packaging arrangement, comprising the following steps:

(a) overlapping five films together, wherein a first film and a fifth film respectively form a first cell film and a second cell film, wherein a third film and a fourth film respectively form a first valve film and a second valve film, wherein a second film forms a strengthening film, wherein a heat-resisting separating layer is provided between the first valve film and the second valve film; and (b) forming an inflatable body by the five films which has one or more inflatable unit which is inflated and able to store gas via a heat-sealing step, wherein the first cell film, the strengthening film and a proximate end of the first valve film are heat-sealed together by a plurality of sealing seams, wherein the second cell film and a proximate end of the second valve film are heat-sealed together, so as to form at least one air entering channel between the first valve film and the second valve film, wherein when a pressure of an inflatable air chamber of the inflatable unit reaches to a predetermined value, the first valve film and the second valve film attach to the second valve film, so as to close the air entering channel, wherein the strengthening film strengthens a connection strength between the first cell film and the first valve film, so as to prevent the first valve film from being broken.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 4B is an enlarged sectional view of the air valve of the air bag packaging arrangement according to the preferred embodiment of the present invention, illustrating the air leaked into the backflow prevention channel.

DETAILED DESCRIPTION OF THE PREFERRED EMBODIMENT

Figure 1:
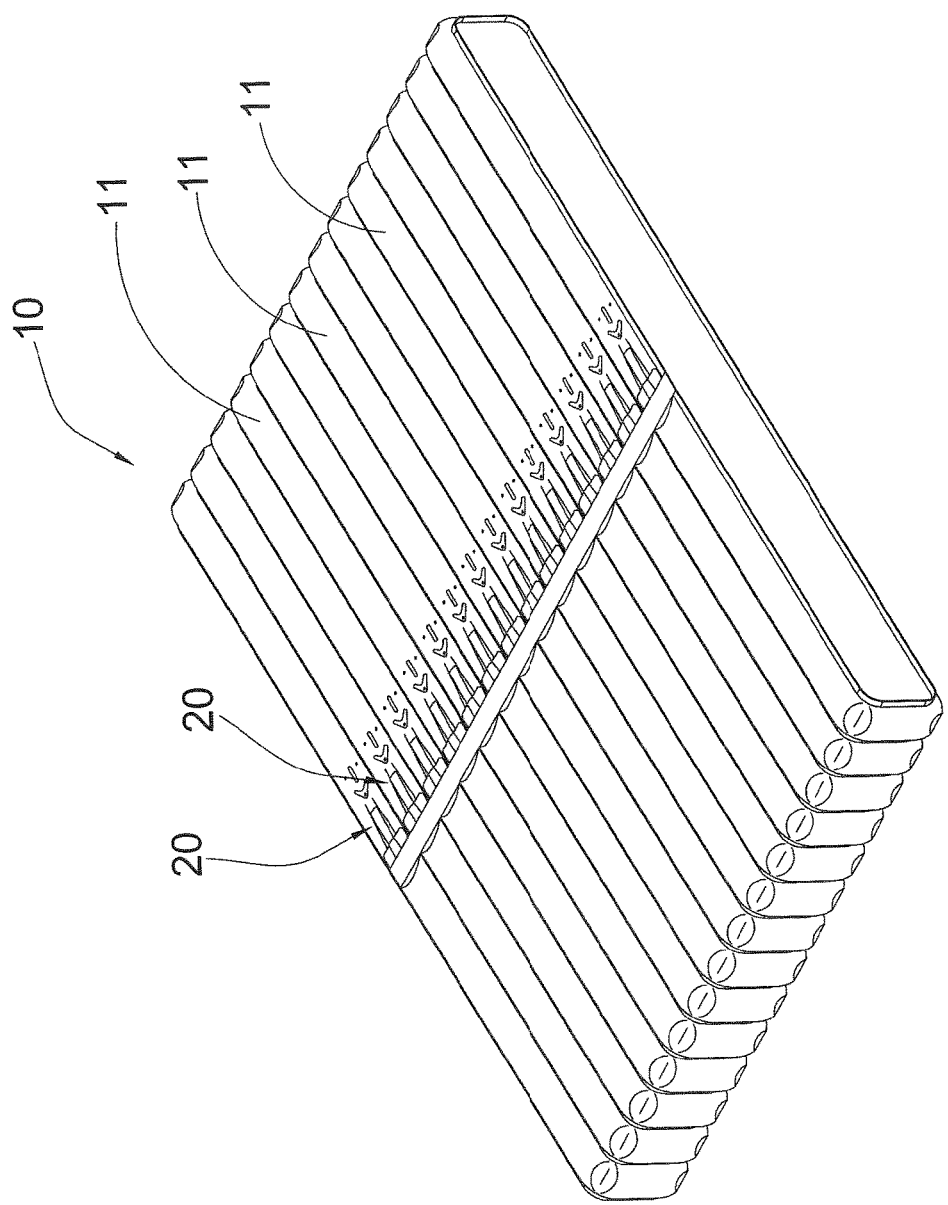
FIG. 1 is a perspective view of an air bag packaging arrangement according to a preferred embodiment of the present invention.
Figure 2:
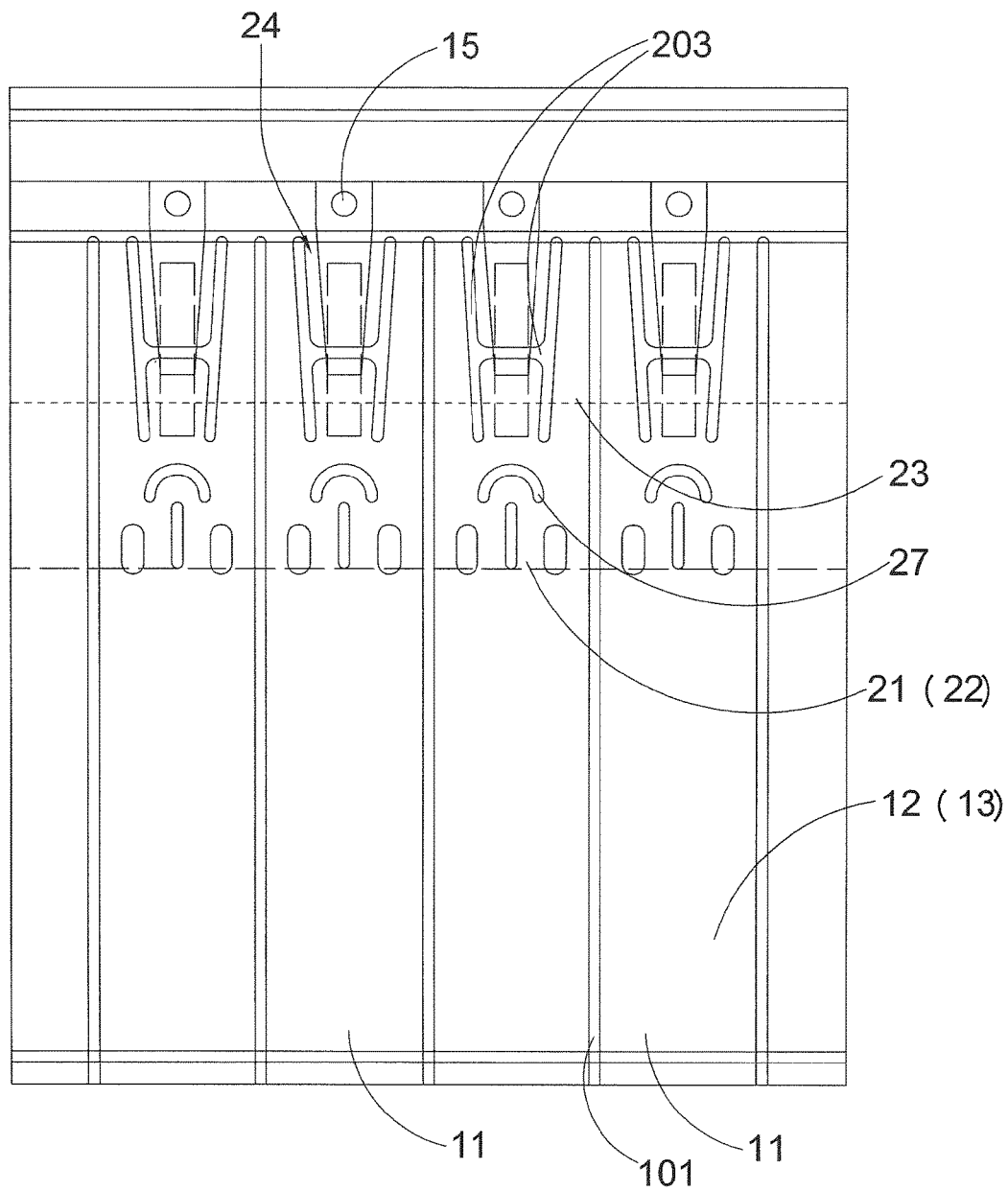
FIG. 2 is a top view of the air valve of the air bag packaging arrangement according to the preferred embodiment of the present invention, illustrating the air bag at a deflated state.

Referring to FIGS. 1 and 2, an air bag packaging arrangement according to a preferred embodiment of the present invention is illustrated, wherein the air bag packaging arrangement is arranged for disposing at a packing area to surround a storage item so as to provide a cushioning effect for the item. Accordingly, the air bag packaging arrangement comprises an air bag 10 and an air valve 20.

The air bag 10 comprises at least one inflatable air cell 11, wherein the air cell 11 comprises a first cell layer 12 and a second cell layer 13 overlapped with each other to form an air chamber 14 and a valve opening 15 communicating with the air chamber 14. As shown in FIGS. 1 and 2, two or more air cells 11 are constructed side-by-side to form the air bag 10, wherein the air valve 20 is provided at each of the air cells 11. In other words, each air cell 11 is an independent cell to be inflated. A sealing wall 101 is formed between two air cells 11. It is appreciated that the air cells 11 are intercommunicating with each other that only one air valve 20 is required to inflate all the air cells 11. In addition, the air bag 10 can be configured at any shape and size since the shape of each of the air cells 11 can be varied after inflation.

Figure 3:
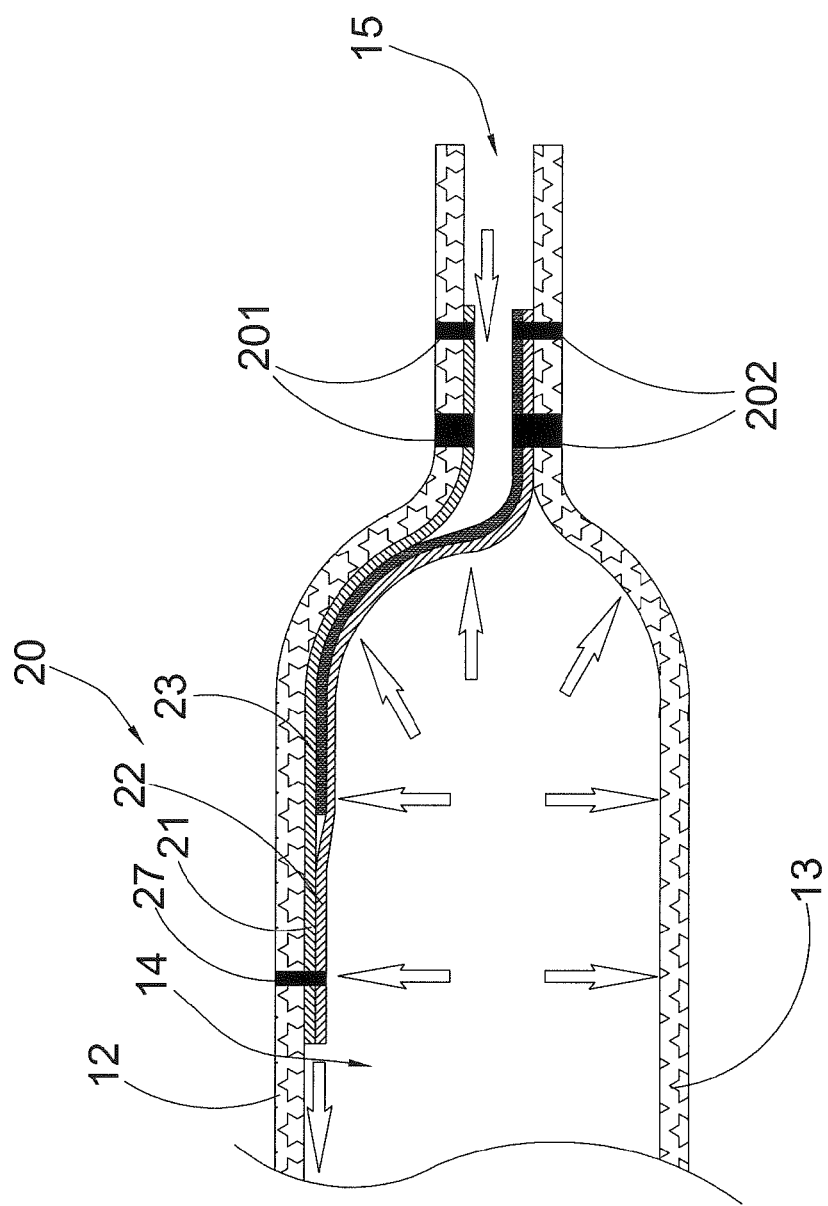
FIG. 3 is a sectional view of the air valve of the air bag packaging arrangement according to the preferred embodiment of the present invention, illustrating the air cell being inflated.

As shown in FIG. 3, the air valve 20 is a double non-return valve for providing double sealing effects for the air bag 10, wherein the air valve 20 comprises a first sealing film 21, a second sealing film 22, and a check sealing film 23.

The first and second sealing films 21, 22 are overlapped between the first and second cell layers 12, 13 of the air cell 11 and extended from the valve opening 15 of the air cell 11 into the air chamber 14 thereof. The first and second sealing films 21, 22 are two thin flexible sheets made of plastic being overlapped with each other, wherein the first and second sealing films 21, 22 are preferably two identical sheets.

Each of the first and second sealing films 21, 22 has a proximal edge extended from the valve opening 15 of the air cell 11 and a distal edge extended to the air chamber 14. Preferably, the proximal and distal edges of the first and second sealing films 21, 22 are coterminous.

As shown in FIG. 3, the proximal edge of the first sealing film 21 is bonded with the first cell layer 12. The proximal edge of the second sealing film 22 is bonded with the second cell layer 13.

The check sealing film 23 is overlapped between the proximal portions of the first and second sealing films 21, 22 to define an air inflating channel 24 between the first sealing film 21 and the check sealing film 23, and a backflow prevention channel 25 between the check sealing film 23 and the second sealing film 22.

Figure 4A:
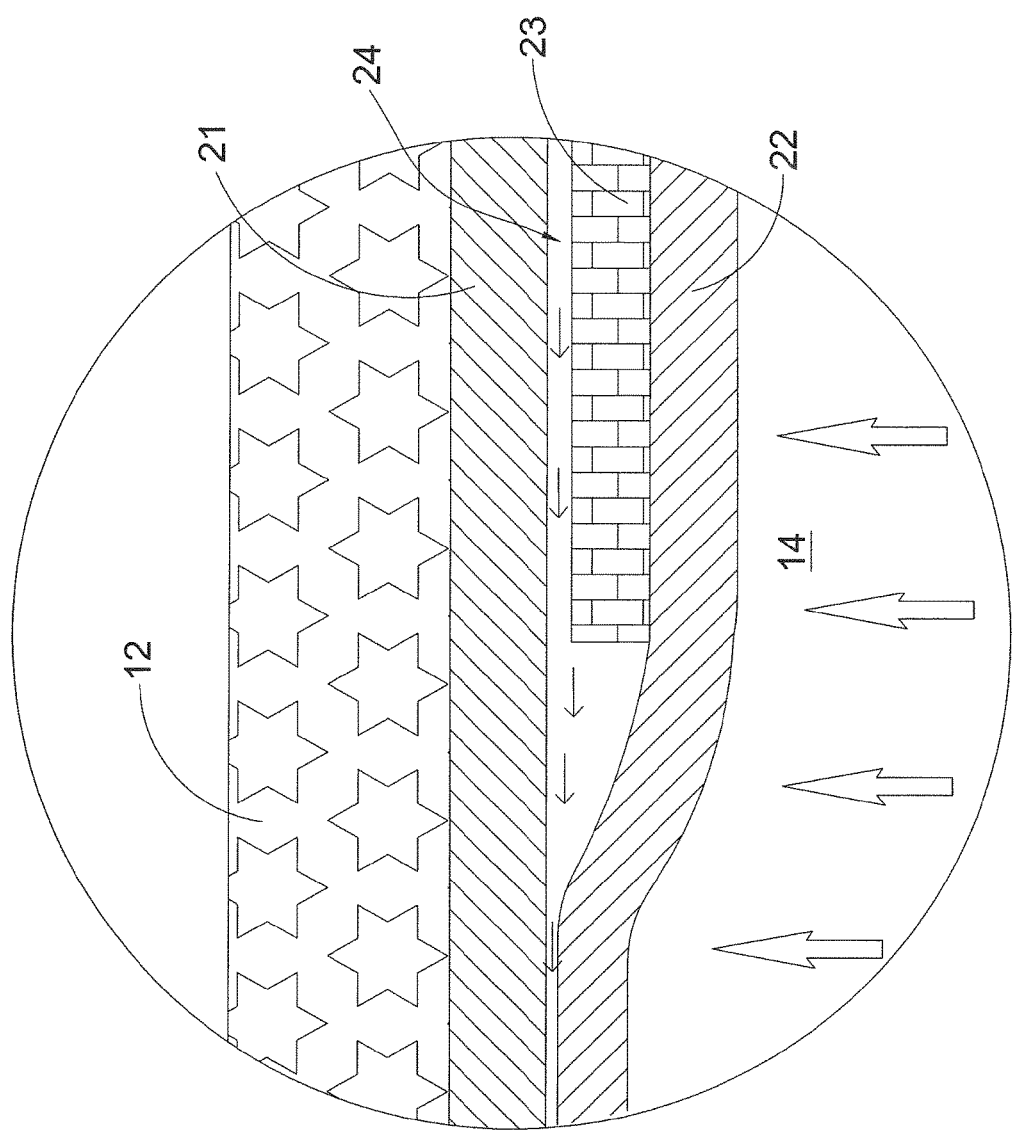
FIG. 4A is an enlarged sectional view of the air valve of the air bag packaging arrangement according to the preferred embodiment of the present invention, illustrating the air passing through the air inflating channel.

As shown in FIG. 4A, the air inflating channel 24 is arranged for inputting air into the air chamber 14 to inflate the air cell 11 until distal portions of the first and second sealing films 21, 22 are overlapped and sealed to close the air inflating channel 24 by means of air pressure within the air chamber 14. According to the preferred embodiment, in case of air leakage between the distal portions of the first and second sealing films 21, 22, as shown in FIG. 4B, the air within the air chamber 14 is guided to flow to the backflow prevention channel 25 for creating a supplemental air pressure to further seal and close the air inflating channel 24, so as to make up a deficient sealing effect of the first and second sealing films 21, 22.

As shown in FIG. 3, the air inflating channel 24 has two opened ends that one proximal opened end of the air inflating channel 24 is formed at the proximal edges of the first sealing film 21 and the check sealing film 23 to communicate with the valve opening 15 while another opposed distal opened end of the air inflating channel 24 is extended toward the distal edges of the first and second sealing films 21, 22 to communicate with the air chamber 14. The compressed air can be inputted at the valve opening 15 to the air chamber 14 through the air inflating channel 24.

It is worth mentioning that when the air cell 11 is inflated, the air pressure is retained within the air chamber 14 to apply the pressing force against the first and second sealing films 21, 22 therewithin, so as to seal the distal portions of the first and second sealing films 21, 22 and to close the distal opened end of the air inflating channel 24. In addition, the distal portions of the first and second sealing films 21, 22 are sealed together by the surface tensions thereof.

The check sealing film 23 is a thin flexible sheet made of plastic. Preferably, the first and second sealing films 21, 22, and the check sealing film 23 are polyethylene (PE) films. In addition, the thickness of each of the first and second cell layers 12, 13 is larger than the thickness of each of the first and second sealing films 21, 22, and the check sealing film 23.

According to the preferred embodiment, the length of the check sealing film 23 is shorter than the length of each of the first and second sealing films 21, 22, such that when the check sealing film 23 is overlapped between the proximal portions of the first and second sealing films, 21, 22, the distal portions of the first and second sealing films 21, 22 are overlapped with each other. It is worth mentioning that the length of the check sealing film 23 is the distance between the proximal and distal edges thereof. The length of each of the first and second sealing films 21, 22 is the distance between the proximal and distal edges thereof.

Accordingly, the proximal edges of the first and second sealing films 21, 22 and the check sealing film 23 are coterminous at the valve opening 15. In addition, the proximal edge of the check sealing film 23 is bonded with the proximal edge of the second sealing film 22.

As shown in FIG. 3, the backflow prevention channel 25 is formed between the check sealing film 23 and the second sealing film 22, wherein the backflow prevention channel 25 has an opened end facing toward the air chamber 14 and a closed end facing toward the valve opening 15. In other words, the proximal end of the backflow prevention channel 25 is the closed end while the distal end of the backflow prevention channel 25 is the opened end.

Accordingly, when the air is filled at the backflow prevention channel 25 at the open end thereof, the backflow prevention channel 25 is inflated for creating the supplemental air pressure to seal and close the air inflating channel 24 between the first sealing film 21 and the check sealing film 23.

It is worth mentioning that when the air is input into the air chamber 15 through the air inflating channel 24, the airflow direction of the air inflating channel 24 is opposite to the airflow direction of the backflow prevention channel 25, as shown in FIGS. 4A and 4B. Therefore, no air will be input to the backflow prevention channel 25. When the air is leaked from the air chamber 15 back to the air inflating channel 24, the air will fill into the backflow prevention channel 25 and to create the supplemental air pressure to seal and close the air inflating channel 24, so as to prevent the air being leaked from the valve opening 15. It is worth mentioning the leaked air will flow from the distal opened end of the air inflating channel 24 to the distal opened end of the backflow prevention channel 25 before exiting the proximal opened end of the air inflating channel 24, so as to prevent the air being leaked to the valve opening 15. In addition, the check sealing film 23 is sealed with the first sealing film 21 by the surface tensions thereof to seal and close the air inflating channel 24.

In order to form the air valve 20 at the air cell 11, the air valve 20 further comprises a first sealing seam 201 bonding the first cell layer 12 with the first sealing film 21 at the valve opening 15 of the air cell 11, and a second sealing seam 202 bonding among the second cell layer 13, the check sealing film 23, and the second sealing film 22 together at the valve opening 15 of the air cell 11.

Accordingly, the proximal edge of the first sealing film 21 is bonded with the first cell layer 12 via the first sealing seam 201. The second cell layer 13 is bonded with the proximal edge of the second sealing film 22 and the proximal edge of the check sealing film 23 via the second sealing seam 202. Preferably, two spaced apart first sealing seams 201 are formed to bond the first cell layer 12 with the first sealing film 21 while two spaced apart second sealing seams 202 are formed to among the second cell layer 13, the check sealing film 23, and the second sealing film 22 together. It is worth mentioning the first and second sealing seams 201, 202 are heat sealed seams, such as heat sealed lines and crescent-shaped heat sealed blocks. In other words, the proximal edge of the first sealing film 21 is heat-sealed with the first cell layer 12 via the first sealing seam 201 by heat sealing. The second cell layer 13 is heat-sealed with the proximal edge of the second sealing film 22 and the proximal edge of the check sealing film 23 via the second sealing seam 202 by heat sealing.

Figure 5:
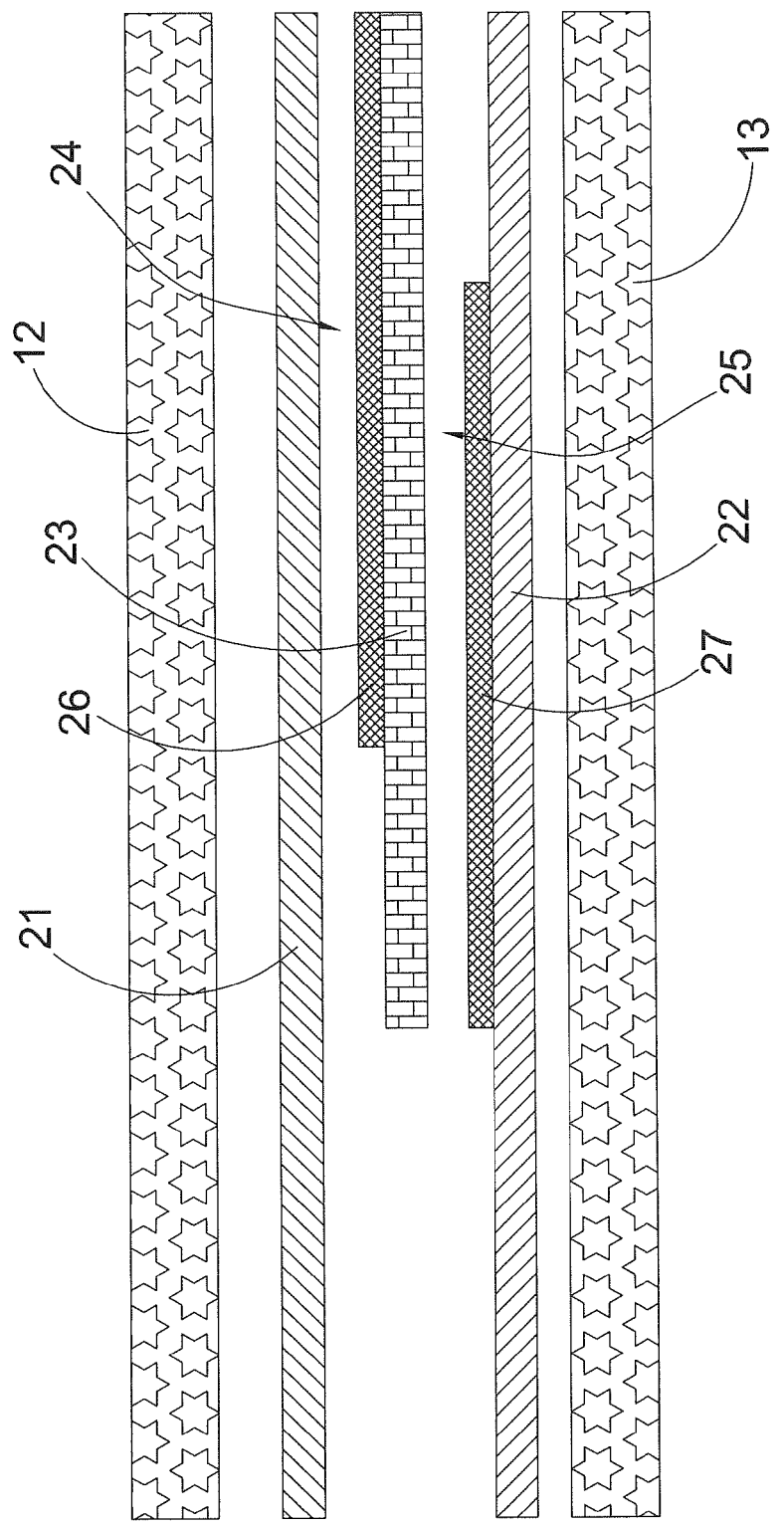
FIG. 5 is an enlarged sectional view of the air valve of the air bag packaging arrangement according to the preferred embodiment of the present invention, illustrating the two heat resisting substances.
Figure 6:
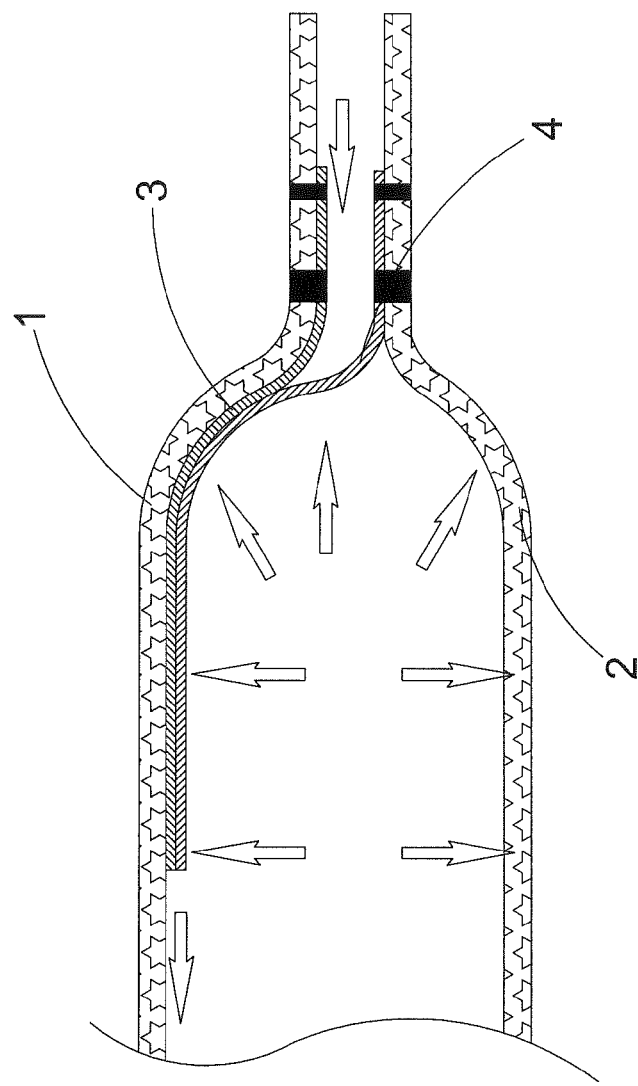
FIG. 6 illustrates an air bag with a conventional air valve.

As shown in FIG. 5, in order to keep an open formation between the first sealing film 21 and the check sealing film 23 after the heat sealing process, the air valve 20 further comprises a first heat resisting substance 26 formed between the first sealing film 21 and the check sealing film 21 for ensuring the air inflating channel 24 between formed therebetween. The first heat resisting substance 26 is provided to prevent the first sealing film 21 and the check sealing film 21 being bonded together after the heat sealing process.

In particular, the first heat resisting substance 26 is provided between the proximal edge portions of the first sealing film 21 and the check sealing film 23 at the valve opening 15 of the air cell 11, so as to ensure the proximal end of the air inflating channel 24 being opened.

Likewise, in order to ensure the open formation between the check sealing film 23 and the second sealing film 22, the air valve 20 further comprises a second heat resisting substance 27 formed between the check sealing film 23 and the second sealing film 22 for ensuring the backflow prevention channel 25 formed therebetween.

In particular, the second heat resisting substance 27 is provided between the distal edge portions of the check sealing film 23 and the second sealing film 22 to ensure the distal end of the backflow prevention channel 25 being opened. It is worth mentioning that the proximal end of the backflow prevention channel 25 is closed by the second sealing seam 202.

According to the preferred embodiment, the first and second heat resisting substances 26, 27 are two heat resisting coatings coated at the respective films at a predetermined location to prevent the films being bonded together during heat sealing process. As shown in FIG. 5, the first heat resisting substance 26 is extended from the proximal end of the check sealing film 23 at one side facing to the first sealing film 21. The second heat resisting substance 27 is extended from the distal end of the check sealing film at an opposed side facing to the second sealing film 22, wherein the second heat resisting substance 27 is not provide at the proximal portion of the check sealing film 23 at the opposed side thereof, such that the proximal end of the backflow prevention channel 25 can be closed by the second sealing seam 202. It is worth mentioning that the second heat resisting substance 27 not only prevents the check sealing film 23 being bonded to the second sealing film 22 to ensure the distal end of the backflow prevention channel 25 being opened but also enhances the check sealing film 23 being coupled to the first sealing film 21 by surface tension to close the air inflating channel 24.

The air valve 20 further comprises two lateral sealing seams 203 as two third sealing seams bonding the first sealing film 21 with the check sealing film 23 to form sidewalls of the air inflating channel 24. The width of the air inflating channel 24 is defined between the two lateral sealing seams 203. In particular, the two lateral sealing seams 203 are two slanted heat sealed seams that the width of the air inflating channel 24 is gradually reducing from the valve opening 15 toward the air chamber 14. In other words, the proximal opened end of the air inflating channel 24 is an enlarged opened end to communicate with the valve opening 15 while the distal opened end of the air inflating channel 24 is a tapered opened end to communicate with the air chamber 14. The tapered air inflating channel 24 will further prevent the air being leaked from the air chamber 14 to the valve opening 15.

Preferably, the lateral sealing seams 203 are extended from the proximal edges of the first and second sealing films 21, 22 toward the distal edges thereof. Therefore, the lateral sealing seams 203 at the proximal portions of the first and second sealing films 21, 22 will bond with the check sealing film 23. The lateral sealing seams 203 at the distal portions of the first and second sealing films 21, 22 will bond the first and second sealing films 21, 22 together.

The air valve 20 further comprises an air blocker 28 provided at the distal portions of the first and second sealing films 21, 22 to block the air in the air chamber 14 being directly flowed back to the air inflating channel 24. Accordingly, the air blocker 28 is aligned with the distal opened end of the air inflating channel 24. The air blocker 28 is formed as a heat sealed seam to heat-bond portions of the first and second sealing films 21, 22, wherein the air blocker 28 has a non-flat blocking surface, such as convex surface or V-shaped surface, aligned with the distal opened end of the air inflating channel 24.

Accordingly, in order to inflate the air cell 11, a probe of the pumping device is inserted into the valve opening 15 to input the compress air into the air inflating channel 24, wherein the air is input at the inflating direction from the proximal opened end of the air inflating channel 24 to the distal opened end thereof, i.e. from the valve opening 15 to the air chamber 14. The air cell 11 will start to be inflated. The air pressure within the air chamber 14 will increase to pop the first and second cell layers 12, 13. At the same time, the air pressure will also exert at the first and second sealing films 21, 22, especially at the distal portions thereof. When the air cell 11 is completely inflated, i.e. the maximum inflation, the air pressure within the air chamber 14 will strong enough to automatically seal the distal portions of the first and second sealing films 21, 22 and to automatically close the distal opened end of the air inflating channel 24. The probe can be removed from the valve opening 15.

When the distal portions of the first and second sealing films 21, 22 are not totally sealed together, the air within the air chamber 14 may leak to the air inflating channel 24. In order to prevent the air being leaked to the air inflating channel 24, the check sealing film 23 is sealed to the first sealing film 21 to close the distal opened end of the air inflating channel 24. In particular, the inputting direction of the backflow prevention channel 25 is opposite to the inflating direction of the air inflating channel 24. In addition, the opened end of the backflow prevention channel 25 is opened up when the distal opened end of the air inflating channel 24 is closed. Therefore, the air is filled to the backflow prevention channel 25 at the opened end thereof and is remained within the backflow prevention channel 25.

The backflow prevention channel 25 is inflated by the air such that the supplemental air pressure within the backflow prevention channel 25 will be created to seal and close the air inflating channel 24, especially the distal opened end of the air inflating channel 24, between the first sealing film 21 and the check sealing film 23. In particular, the greater the supplemental air pressure within the backflow prevention channel 25 is, the better the sealing effect of the check sealing film 23 forms. In other words, when air within the air chamber 14 is leaked to reduce the air pressure therewithin, the air is filled the backflow prevention channel 25 to increase the air pressure therewithin. Therefore, the total air pressure of the air cell, i.e. the sum of the air pressures within the air chamber 14 and the backflow prevention channel 25, will remain the same. As a result, the air leaked from the air chamber 14 to the backflow prevention channel 25 will further enhance the sealing effect to seal and close the air inflating channel 24.

It is worth mentioning that the air cell 10 can be inflated with air or other inert gas to provide particular functions such as heat resistant or fire protection.

In order to manufacturing the air bag 10, the present invention further provides a manufacturing method which comprises the following steps:

(1) Overlap five sheets with each other, wherein the first and fifth sheets form the first and second cell layers 12, 13, the second and third sheets form the first and second sealing films 21, 22, and the third sheet forms the check sealing film 23. According to the preferred embodiment, the air valve 20 of the present invention can incorporate with any air cell 11 having two cell layers 12, 13. In other words, the step (1) can be rewritten as placing the air valve 20 between the first and second cell layers 12, 13.

(2) Apply the first heat resisting substance 26 between the first sealing film 21 and the check sealing film 21, and apply the second heat resisting substance 27 between the check sealing film 23 and the second sealing film 22.

(3) Bond the proximal edge of the first sealing film 21 with the first cell layer 12 via the first sealing seam 201 by means of heat sealing. Then, bond the second cell layer 13 with the proximal edge of the second sealing film 22 and the proximal edge of the check sealing film 23 via the second sealing seam 202 by means of heat sealing. It is worth mentioning that the air inflating channel 24 is formed between the first sealing film 21 and the check sealing film 23 to communicate the valve opening 15 with the air chamber 14. In addition, the backflow prevention channel 25 is also formed between the check sealing film 23 and the second sealing film 22 that the backflow prevention channel 25 has one opened end and an opposed closed end.

(4) Form the two lateral sealing seams 203 to bond the first sealing film 21 with the check sealing film 23 so as to form sidewalls of the air inflating channel 24.

(5) Form the air blocker 28 provided at the distal portions of the first and second sealing films 21, 22.

Referring to FIG. 7 to FIG. 11 of the drawings, a self-adhesive checking valve 10A, which is adapted for incorporating with a fluid packaging arrangement, is illustrated. Fluid is filled into the fluid packaging arrangement through the self-adhesive checking valve 10A and is prevented from leakage therethrough. Preferably, the self-adhesive checking valve 10A is fittingly incorporated with an air bag packaging arrangement, wherein air is filled into the air bag packaging arrangement and is prevented from leakage therethrough, so that cushioning effect of the air bag packaging arrangement is ensured.

Figure 7:
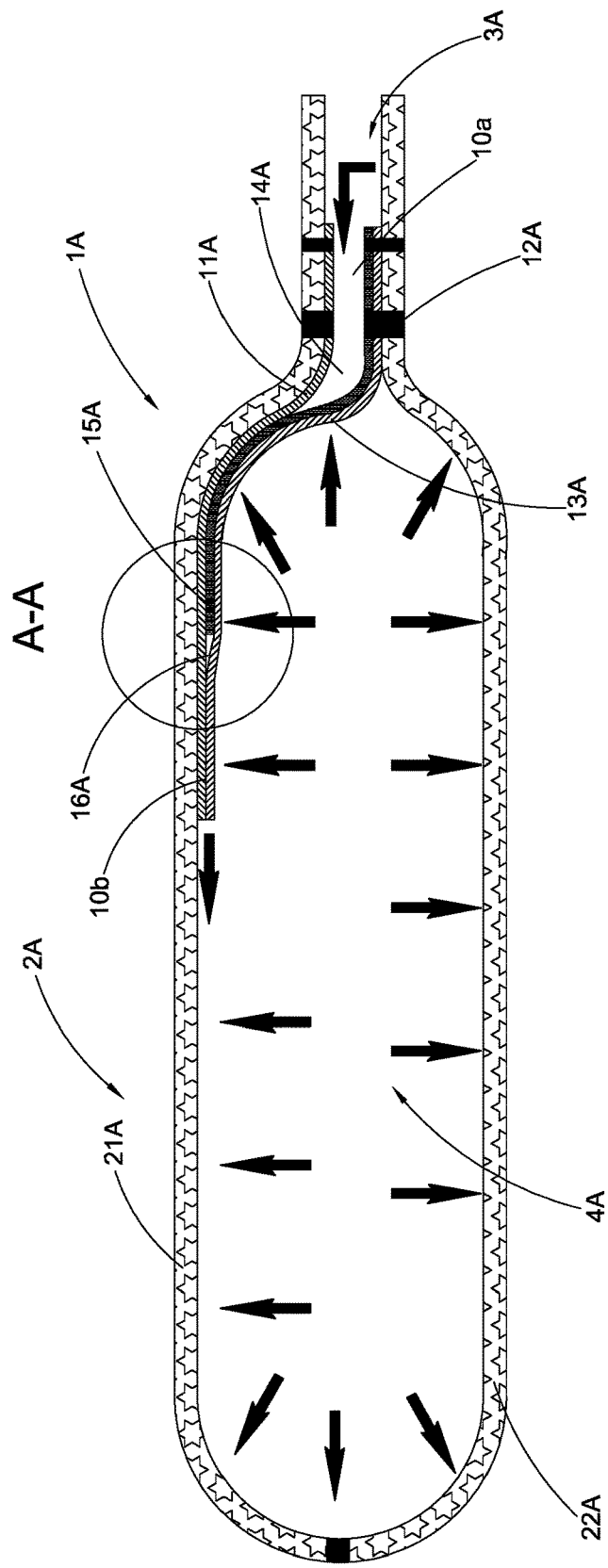
FIG. 7 is a sectional view of a self-adhesive valve according to a second preferred embodiment of the present invention.

According to this preferred embodiment, the air bag packaging arrangement comprises an air cushioning layer 1A comprising a plurality of independent and parallel air cushioning cells 2A and an air channel 3A communicated with the air cushioning cells 2A for inflating air into each of the air cushioning cells 2A. The plurality of air cushioning cells 2A are aligned to provide a receiving chamber 5A for storing an item therein. Referring to FIG. 7 of the drawings, a plurality of self-adhesive valves 10A are used to inflate the air cushioning cells 2A respectively through the air channel 3A which is communicated with the air cushioning cells 2A.

More specifically, the self-adhesive checking valve comprises a first valve film 11A, a second valve film 12A, and a third valve film 13A. The first valve film 11A and the third valve film 12A are at outside while the second valve film is intermediate the first valve film 11A and the third valve film 12A. The first valve film 11A and the second valve film 12A form an air inflating channel 14A therebetween, while the second valve film 11A and the third valve film 12A form a backflow prevention channel 15A. When air is filled into a receiving cavity 4A through the air inflating channel 14A, the inner surfaces of the first valve film 11A, the second valve film 12A, and the third valve film 13A are adhered with each other so that the air in the receiving cavity 4A cannot flow out through the air inflating channel 14A. In case of leakage, the air gets into the backflow prevention channel 15A for creating a supplemental air pressure to apply on the second valve film 12A to further seal and close the air inflating channel 14A, so that the air is prevented from leaking through the air inflating channel 14A. In this preferred embodiment, the receiving cavity 4A a storing space of each of the air cushioning cells 2A.

Figure 8:
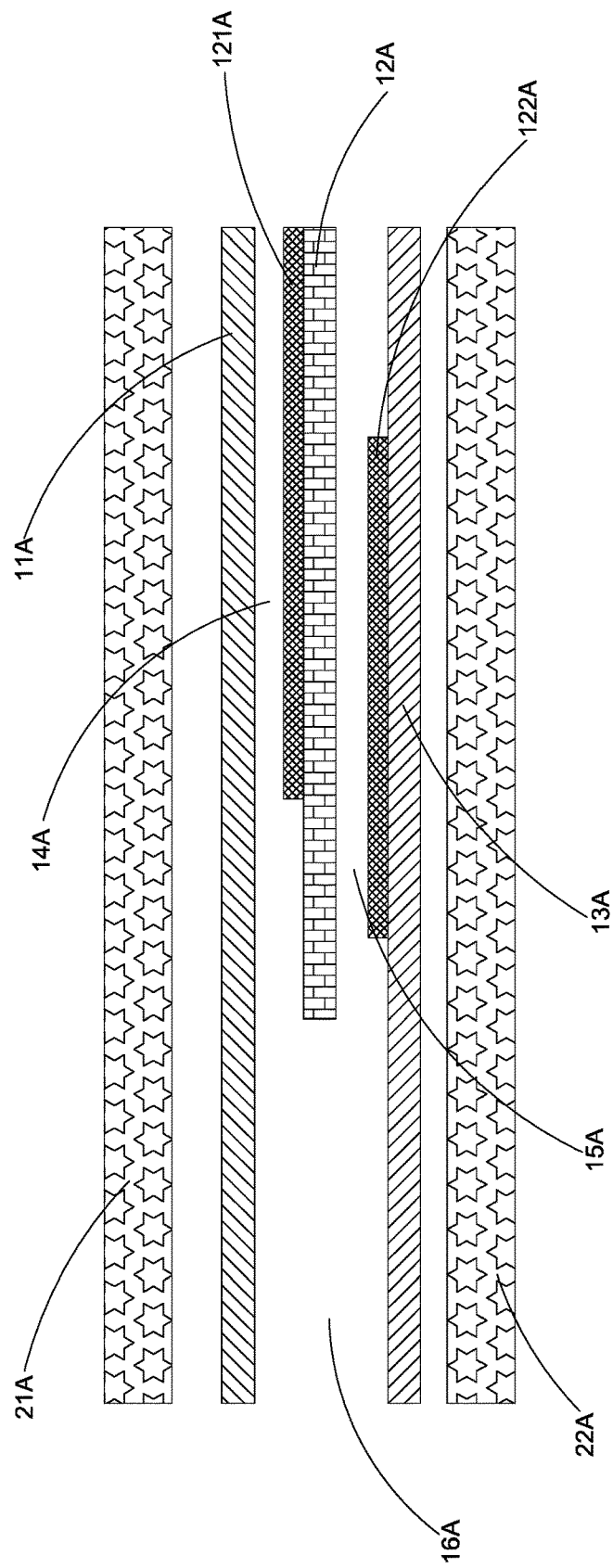
FIG. 8 is an exploded view of the self-adhesive valve according to the above second preferred embodiment of the present invention.
Figure 9:
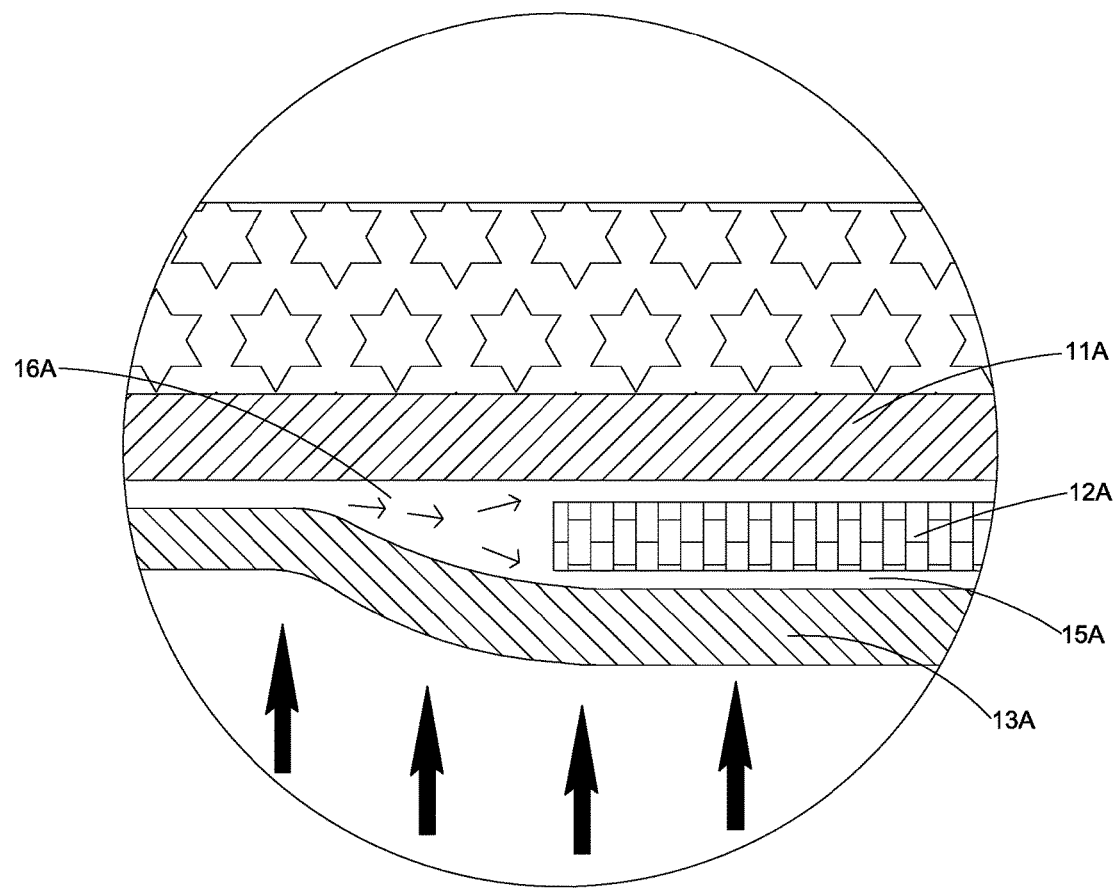
FIG. 9 is an enlarged view of A-A in FIG. 8.

In other words, the air flows from the air channel 3A into the air inflating channel 14A of the self-adhesive checking valve 10A, so that each of the air cushioning cells of the air bag packaging arrangement can be filled with air. When each of the air cushioning cells is filled with air and a desired air pressure is obtained, the air inflating process is stopped. At that time, because of property of the three valve films, the first valve film 11A, the second valve film 12A, and the third valve film 13A are adhered with each other. Referring to FIG. 7 to FIG. 8 of the drawings, the air in each of the air cushioning cells applies pressure onto the third valve film 13A, so that the third valve film 13A biases against the second valve film 12A and the first valve film 11A in such a manner that the three valve films are firmly attached to a wall of each of the air cushioning cells 2A, so that the air cannot easily flow back into the air inflating channel 14A through the three valve films.

It is worth to mention that, the air inflating channel 14A is formed between the first valve film 11A and the second valve film 12A. In other words, at an air inflating side 10a of the self-adhesive checking valve 10A, the first valve film 11A are not completely attached with each other, so that an air passage communicated with the receiving cavity 4A is provided. But the second valve film 12A and the third valve film 13A at the air inflating side 10a are sealed with each other.

In other words, the self-adhesive checking valve 10A has a first side 10a, the first valve film 11A and the second valve film 12A are not sealed with each other at the first side 10a. At another side of the self-adhesive checking valve 10A, i.e a second side 10b of the self-adhesive checking valve 10A, the second valve film 12A and the third valve film are not sealed with each other, so that a gap is formed therebetween so as to provide the backflow prevention channel 15A. When air gets into the backflow prevention channel 15A, because the second valve film 12A and the third valve film are sealed with each other at the air inflating side 10a, the air cannot flow out. When the receiving cavity 4A is filled with air, the air flows back into the backflow prevention channel 15A and creates an air pressure to apply onto the second valve film 12A, so that the second valve film 12A is attached to the first valve film 11A to further seal the air inflating channel 14A, so that the air cannot easily flow out.

The first valve film 11A, the second valve film 12A, and the third valve film 13A are made of flexible material, preferably PE. A first blocking layer 121A is provided between the first valve film 11A and the second valve film 12A, so that when the self-adhesive checking valve undergoes a heat sealing process, the first valve film 11A and the second valve film 12A are not completely sealed with each other so that the air inflating channel 14A is formed therebetween. A second blocking layer 122A is provided between the second valve film 11A and the third valve film 12A, a length of the second blocking layer 122A is smaller than a length of the second valve film 12A, so that end portions of the second blocking layer 122A are not aligned in an end-to-end manner with the second valve film 12A and the third valve film 13A at the inflating side 10a, so that the second valve film 12A and the third valve film 13A at the inflating side 10a are completely sealed with each other for preventing air leakage. Accordingly, the first blocking layer 121A and the second blocking layer 122A are high temperature durable material, so that during the heat sealing process, the areas with the high temperature durable material are not heat sealed with each other, so that gaps are provided therebetween. In other words, more specifically, referring to FIG. 8 to FIG. 9 of the drawings, a first high temperature durable ink 121A is printed between the first valve film 11A and the second valve film 12A, so that when the self-adhesive checking valve 10A is undergoing the heat sealing process, the first valve film 11A and the second valve film 12A are not completely heat sealed with each other, but forming the air inflating channel 14A instead. A second high temperature durable ink 122A is printed between the second valve film 12A and the third valve film 13A, a length of the second high temperature durable ink 122A is smaller than a length of the second valve film 12A, so that the second high temperature durable ink 122A is not aligned in an end-to-end manner with the second valve film 12A and the third valve film 13A at the air inflating side 10a, so that the second valve film 12A and the third valve film 13A of the self-adhesive checking film 10A at the air inflating side 10a are sealed with each other to prevent air leakage.

In other words, when the air receiving cavity 4A is filled with air, in case of air leakage, the air has to select choices between opening the first valve film 11A and the second valve film 12A, or opening the second valve film 12A and the third valve film 13A, so that backflow of the air is not easy. The air flows into the backflow prevention channel 15A between the second valve film 12A and the third valve film 13A will further seal and close the air inflating channel 14A, so that the air cannot flow out though the air inflating channel 14A. Accordingly, the backflow prevention channel 15A is not communicated with the air channel 3A, so that the air maintains to stay in the backflow prevention channel 15A to further seal and close the air inflating channel 14A.

Preferably, a length of the second valve film 12A is smaller than the lengths of the first valve film 11A and the third valve film. In this preferred embodiment, the first valve film 11A and the third valve film 13A have a same length, the length of the second valve film 12A is smaller than the length of the first valve film 11A and the third valve film 13A. A back flow channel 16A is formed between the first valve film 11A and the third valve film 13A at the second side 10b of the self-adhesive checking valve 10A, so that when the air is about to escape from the receiving cavity 4A, the air has to enter into the backflow channel 16A between the first valve film 11A and the third valve film 13A first, and then the air has to choose choices between entering into the air inflating channel 14A between the first valve film 11A and the second valve film 12A and entering into the backflow prevention channel 15A between the second valve film 12A and the third valve film 13A. In other words, the air has to climb two stages before getting out, so that possibility and speed of backflow of the air is greatly decreased. Therefore, an increase of numbers of the valve films slows down the backflow speed, and even further, when the air flows into the backflow prevention channel 15A between the second valve film 12A and the third valve film 13A, a supplemental air pressure is created to apply on the second valve film 12A, so that the second valve film 12A is more firmly attached with the first valve film 11A, so that air leakage is effectively prevented.

In other words, before flowing out, the air has to open and enter into the backflow channel 16A between the first valve film 11A and the third valve film 13A, and then chooses to enter into the air inflating channel 14A or the backflow prevention channel 15A, so that the possibility of successfully getting out through the air inflating channel 15A is rare. And the air getting into the backflow prevention channel 15A will further seal and close the air inflating channel 14A for preventing a subsequent air leakage, so that the air can stay in the receiving cavity 4A for a relatively long period of time. Accordingly, in this preferred embodiment, the air can stay in each of the air cushioning cells 2A for a long time, so that a good cushioning effect can be maintained for a long time.

In another aspect of the prevent invention, the self-adhesive checking valve 10A comprises two inflating valve films 11A, 13A, and a checking film 12A which is provided between the two inflating valve films 11A, 13A. One of the inflating valve films 11A and the checking film 12A forms an air inflating channel 14A therebetween, the other of the inflating films 13A and the checking film 12A forms a backflow prevention channel 15A therebetween. When air is inflated into the receiving cavity 4A through the air inflating channel 14A, the inner surfaces of two inflating valve films 11A, 13A, and the checking film 12A are adhered with each other, so that the air in the receiving cavity 4A is not easy to flow back into the air inflating channel 14A. And furthermore, in case of leakage, the air gets into the backflow prevention channel 15A and creates a supplemental air pressure to apply on the checking film 12A so as to further seal and close the air inflating channel 14A, so that air leakage is prevented.

When the self-adhesive checking valve 10A is incorporated into an air bag packaging arrangement, each of the air cushioning cells 2A of the air bag packaging arrangement comprises a first sealing film 21A and a second sealing film 22A defining the receiving cavity 4A. The self-adhesive checking valve 10A is provided between the first sealing film 21A and the second sealing film 22A for filling air into the air cushioning cells and also preventing air leakage, so that cushioning effect of the air bag packaging arrangement is enhanced.

More specifically, at the first side 10a of the self-adhesive checking valve 10A, i.e. the air inflating side, the first valve film 11A is heat sealed with the first sealing film 21A, the second valve film 12A, the third valve film, and the second sealing film 22A are heal sealed together, so that when air from the air channel 3A flows into the receiving cavity 4A through the air inflating channel 14A between the first valve film 11A and the second valve film 12A. When the inflating process is stopped, inner surfaces of the first valve film 11A, the second valve film 12A, and the third valve film 13A are automatically attached with each other. As an example, the first valve film 11A, the second valve film 12A, and the third valve film 13A are attached to the first sealing film 21a, so that it is not easy for the air in the receiving cavity 4A to flow back into the air inflating channel 14A. And the air getting into the backflow prevention channel 15A creates a supplemental air pressure to apply on the second valve film to further seal and close the air inflating channel 14A.

Figure 10:
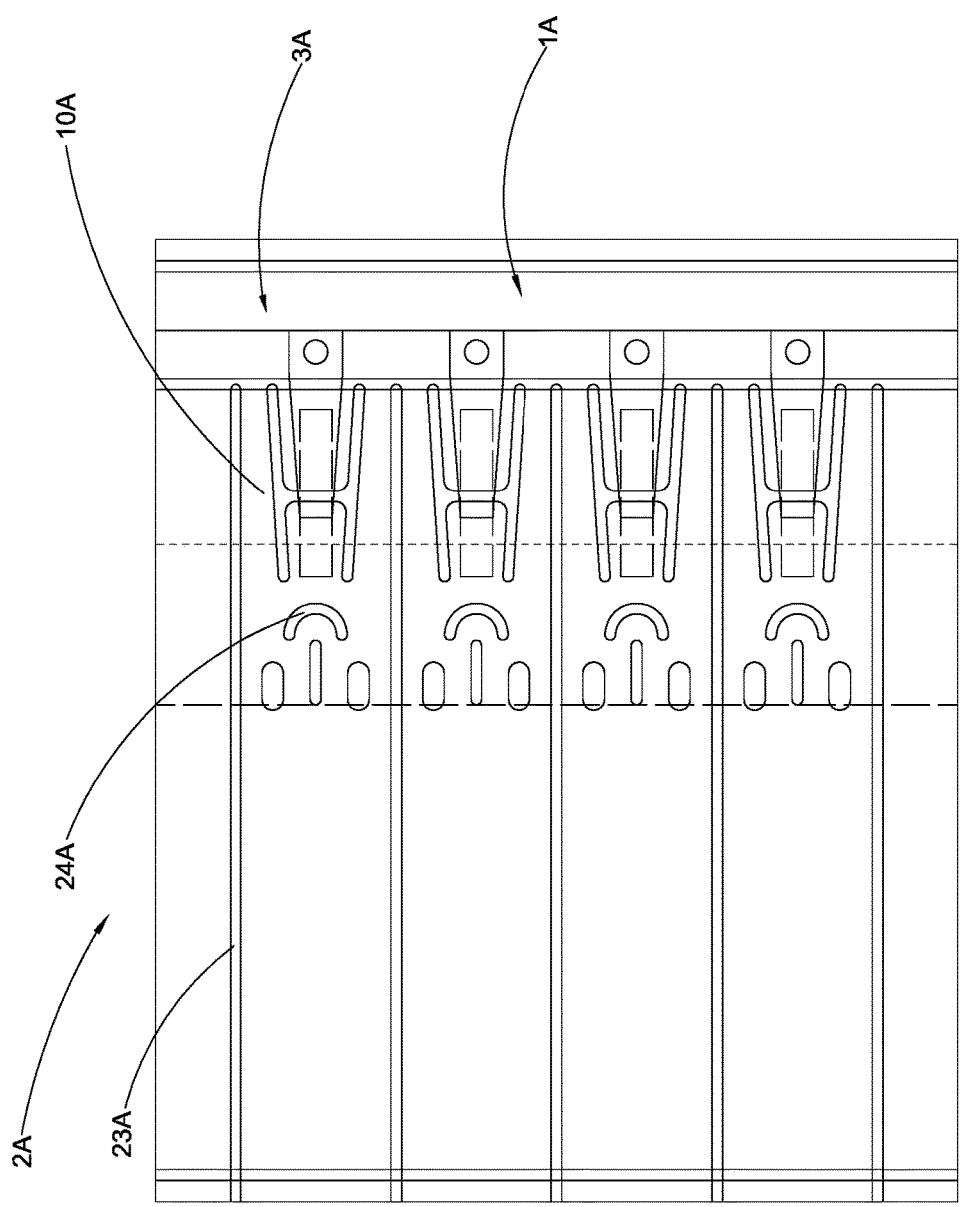
FIG. 10 is a perspective view of the self-adhesive valve according to the above second preferred embodiment of the present invention.
Figure 11:
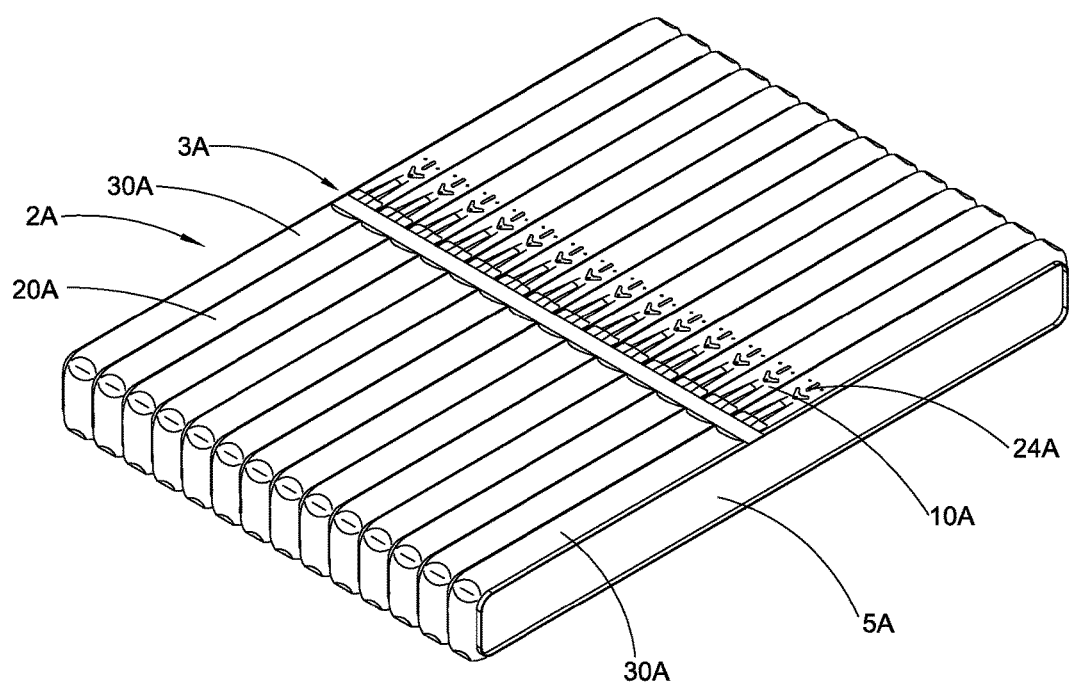
FIG. 11 is perspective view of an air bag packaging arrangement with the self-adhesive valve according to the above second preferred embodiment of the present invention.

Referring to FIG. 10 to FIG. 11 of the drawings, each of the air cushioning cells comprises a bonding line 23A, the first sealing film 21A is overlapped with the second sealing film 22A and bonded together along the bonding line 23A so as to form the parallel air cushioning cells 21A which are communicated with the air channel 3A.

The air cushioning layer 1A comprises at least two side portions 30A which are connected one by one. Each of the air cushioning cells 2A may further comprise at least two secondary air cushioning cells 20A. Each of the secondary air cushioning cells 20A of the air cushioning cell 2A is communicated with an adjacent secondary cushioning cell 20A. Accordingly, each of the secondary cushioning cells 20A of an air cushioning cell 2A forms a corresponding side portion 30A. In other words, each of the side portions 30A comprises at least group of parallel secondary air cushioning cells 20A of the air cushioning cells 2A.

The air cushioning layer 1A further comprises a plurality of air blocking members 24A provided in each of the air cushioning cells 2A adjacent to the air inflating channel 14A for preventing air leakage.

Preferably, the air cushioning layer 1A has 3~8 side portions 30A. The number of the secondary air cushioning cells 20A of each of air cushioning cells 2A is not less than the number of the side portions 30A. The secondary cushioning cells 20A of the an air cushioning cell 2A form the corresponding side portions 30A respectively and are folded along area separating bonding lines to form a hollow structure defining the receiving chamber 5A, In addition, the air bag packaging arrangement may further comprise an outer layer for protecting the air cushioning layer 1A, and a switch can be provided so that when the switch is opened, an item and be put into the receiving chamber 5A of the air cushioning layer 1A.

Accordingly, the self-adhesive checking valve 10A provides a method for filling in a fluid receiving cavity with fluid and preventing the fluid to flow out, preferably, the fluid is air. The method comprises the following steps:

(a) Filling air into a receiving cavity 4A through an air inflating channel 14A between a first valve film 11A and a second valve film 12A, wherein when the filling process is stopped, the first valve film 11A and the second valve film 12A are attached with each other because of the air pressure in the receiving cavity 4A, so that the air inflating channel 14A is closed; and (b) Guiding the air in the receiving cavity 4A into a backflow prevention channel 15A between the second valve film 12A and a third valve film 13A so as to further seal and close the air inflating channel 14A, so that air in the receiving cavity 4A is not easy to flow out of the receiving cavity 4A.

FIGS. 14 to 18 illustrate an air bag packaging arrangement according to a third preferred embodiment of the present invention, wherein the air bag packaging arrangement has an inflatable structure, which is able to be used to provide an air cushioning effect after being inflated for various packaging items, such as electronic products, food, medicine products, chemical materials, biological materials, plastics, ceramics, and Fast Moving Consumer Goods. In an unused position, the air bag packaging arrangement can be stored and transported in an un-inflating state. One user can inflate the air bag packaging arrangements when he/she would use them. The air bag packaging arrangements have the advantage of easy to use.

Figure 18:
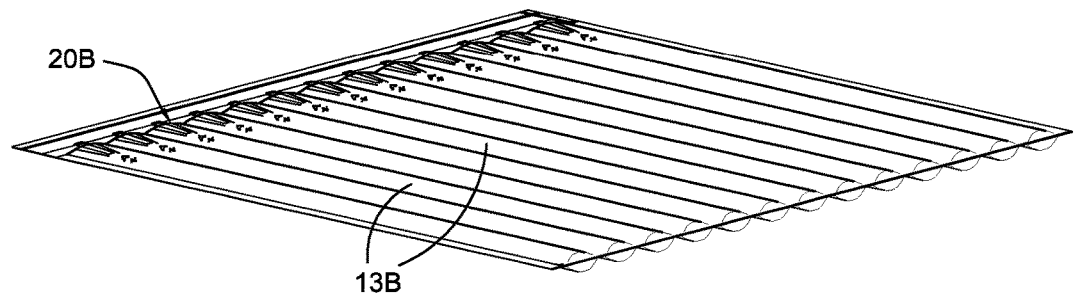
FIG. 18 illustrates the structure of the air bag packaging arrangement according to the above third preferred embodiment of the present invention after being inflated.

According to the preferred embodiment of the present invention, the air bag packaging arrangement can be an air cushioning material, which can form the air crash pad as illustrated in FIG. 18 and then provide air cushioning effect for the items. The air bag packaging arrangement can also be placed into other packaging arrangement, such as a packaging box, functions as a filling material to provide the air cushioning effect for the packaging items.

More specifically, the air bag packaging arrangement comprises at least one inflatable body 10B, wherein the inflatable body 10B comprises two cell films, so as to form at least one inflatable unit 13B. The air bag packaging arrangement further comprises at least one air valve 20B, which is used to inflate the inflatable unit 13B. For ease of description, one of the two cell films is defined as a first cell film 11B, wherein another one of the two cell films is defined as a second cell film 12B. One skilled in the art will understand that the upper or lower position of the first cell film 11B and the second cell film 12B shown in the drawings is relative. In practical application, the first cell film 11B may be provide at a lower position than the second cell film 12B, wherein the second cell film 12B may be provided at a higher position than the first cell film 11B.

The inflatable unit 13B is mainly formed by the two cell films, i.e. the first cell film 11B and the second cell film 12B by heat sealing, the first cell film 11B and the second cell film 12B are able to be two flexible films, which are able to be made of various proper materials, such as polyethylene film, polypropylene film, polyvinyl chloride film, polyester film, polystyrene film, and composite film There is no limitation in this respect according to the present invention. All proper flexibility films are able to be used to make the cell films. The first cell film 11B and the second cell film 12B overlaps with each other and are heat-sealed together to form an inflatable air chamber 14B of the inflatable unit 13B, wherein the inflatable air chamber 14B is used to store gas.

The air valve 20B is used to inflate the inflatable unit 13B. In other words, gas, such as air, enters into the inflatable air cell 14B of each the inflatable unit 13B through the air valve 20B. After air pressure in the inflatable air cell 14B meets requirement, the inflating process is stopped, so that the air bag packaging arrangement provides is able to provide an air cushioning effect when in an inflated condition.

It is worth mentioning that, according to the preferred embodiment of the present invention, the air valve 20B is a one-way air valve. In other words, during inflating, after air pressure in the inflatable air cell 14B reaches to a predetermined value, the air pressure in the inflatable air cell 14B will close the air valve 20B, so the inflating will stop and the air in the inflatable air cell 14B will not easily leak from the air valve 20B.

More specifically, the air valve 20B comprises two valve films 21B and 22B and at least one strengthening film 23B. In similar, the two valve films 21B and 22B are respectively defined as a first valve film 21B and a second valve film 22B, wherein one skilled in the art will understand that the location relationship of the first valve film 21B and second valve film 22B is relative. In practical application, the first valve film 21B may be located below the second valve film 22B. The second valve film 22B may be located above the first valve film 21B.

In similar, the first valve film 21B, the second valve film 22B and the strengthening film 23B are able to be three flexible films, which are able to be made of various film materials, such as polyethylene film, polypropylene film, polyvinyl chloride film, polyester film, polystyrene film and composite film. There is no limitation in this respect according to the present invention. All proper flexibility films are able to be used to make the valve films.

According to this preferred embodiment of the present invention, the first valve film 21B and the second valve film 22B overlap with each other. After being arranged with the first cell film 11B and the second cell film 12B, the first valve film 21B and the second valve film 22B are heat sealed through a series of proper heat sealing seams 30 to form an inflatable structure. The heat sealing seams 30 are formed through proper heat-sealing technology, so that two or three films are heat sealed at required positions.

Above mentioned five films are heat-sealed to form inner gas storage rooms and form a main channel 15B, wherein the main channel 15B has an air inflating opening 151B, wherein an inflating mouth of an inflating arrangement 40B enters into the main channel 15B through the air inflating opening 151B, so that the inflatable body 10B is suitable to be inflated through the main channel 15B.

More specifically, the first valve film 21B and the second valve film 22B overlap with each other and being heat sealed to form at least one air entering channel 24B, and to form an air entering opening 241B to the air entering end wherein the air entering opening is used to inflate, wherein the air entering channel 24B and the main channel 15B communicate with each other. During inflating, users can use the inflating arrangement 40B, such as an inflating pump to inflate to the air bag packaging arrangement from the air inflating opening. The air enter into the main channel 15B from the air inflating opening 151BB, and enter into the air entering channel 24B from the main channel 15 and though each of the air entering opening 141, to inflate to the inflatable unit 13B, so that each of the inflatable air cell 14B is inflated with a predetermined amount of air.

It is worth mentioning that the heat sealing seams 30 comprises a plurality of dividing seams 31, so that two or more inflatable units 13B connect with each other side by side to form the inflatable body 10B, wherein the air valve 20B forms the air entering channel 24B corresponding to each of the inflatable unit 13B. In other words, each of the inflatable units 13B is able to be inflated independently. Each of the dividing seams 31B is formed between two of the inflatable units 13B, wherein the dividing seam 31B can be a heat-sealing line between two of the inflatable units 13B adjacent to each other, so as to form a plurality of individual inflatable air chambers 14B by these dividing seams 31. Hence, if one of the inflatable units 13B is damaged to leak, other inflatable units 13B will not be affected. Of course, it is worth mentioning that the inflatable unit 13B also can communicate with each other, so that only one single air entering channel 24B formed by one air valve 20B is enough to inflate all of the inflatable units 11. In other words, the air bag packaging arrangement according to the present invention can form a plurality of the inflatable units 13B through heat-sealing the first cell film 11B and the second cell film 12B.

In the preferred embodiment, the air valves 20B correspond with a plurality of the inflatable units 13B and form a plurality of the air entering channels 24B. That is to say, when the dividing seams 31B heat-seal the two cell films 11B and 12B, the dividing seams 31B heat-seal the valve film 21, 22 and the strengthening film 23B, so that the five films are heat-sealed together to form a plurality of the air entering channels 24B and a plurality of the inflatable air chambers 14, wherein each of the air entering channels 24B is suitable to inflate the corresponding inflatable air chambers 14.

It is worth mentioning that a plurality of the dividing seams 31 which are spacedly arranged with each other and can be arranged with equal distances to form a plurality of the inflatable units 13B with the same size. Of course, the dividing seams 31 can also arrange with unequal distance to form a plurality of the inflatable units 13B with different sizes. A plurality of the spacedly arranged dividing seams 31 can be parallel with each other. According to the present invention, there is no limitation in this aspect. Each of the inflatable units 13B can form with one of the air entering channels 24B. Two or more of the air entering channels 24B can be formed to the inflatable unit 13B which has a bigger size by heat-sealing technology, so as to improve inflating efficiency.

In addition, the shape of each inflatable unit 13B is able to change after being inflated, so the inflatable body 10B can form various shapes and sizes. The inflatable unit 13B can be strip, such as crosswise strip and/or lengthways strip et al., or bulk block. It is worth mentioning that the shape is not limited. In the preferred embodiment, the inflatable unit 13B can form to have a strip structure.

According to the present invention, the strengthening film 23B is placed between the first cell film 11B and the first valve film 21B to strengthen the joint strength between the first cell film 11B and the first valve film 21B. More specifically, the first valve film 21B has a near end 211B at the position near to the air entering opening 241B and a distal end 212B far from the air entering opening 241B. The strengthening film 23B has a proximate end 231B at the position near to the air entering opening 241B and a distal end 232B far from the air entering opening 241B. The proximate end 211B of the first valve film 21B, the proximate end 231B of the strengthening film 23B and the first cell film 11B are heat-sealed together, so that the joint strength among the proximate end of the air valve 20B, the first cell film 11B and the first valve film 21B is strengthened by the strengthening film 23B.

In other words, at the proximate end of the air valve 20B, three films 11B, 21B and 23B are heat-sealed together, so the first cell film 11B and the first valve film 21B will not easily crack. The strengthening film 23B between the first valve film 21B and the first cell film 11B plays a strengthening role to strengthen the connection between the first valve film 21B and the first cell film 11B. On the other hand, the upside and the downside of the proximate end 231B of the strengthening film 23B are respectively heat-sealed together with the first cell film 11B and the first valve film 21B. Thus, the connection between the strengthening film 23B and the first cell film 11B will play a strengthen role by the first valve film 21B at the bottom, so as to prevent cracking between the strengthening film 23B and the first cell film 11B. The connection between the strengthening film 23B and the first valve film 21B will play a strengthen role by the first cell film 11B at the upside, so as to prevent the cracking between the strengthening film 23B and the first valve film 21B.

During inflating, air enters into the inflatable air chamber 14B from the air entering opening 241B and through the air entering channel 24B. After the pressure in the inflatable air cell 24 reach to a value large enough, the two valve films 21B and 22B attach to one of the cell films, such as the second cell film 12B to close the air entering channel 24B, so as to prevent air reversing from the air entering channel 24B. According to the prior art, the joint between inner film 2B and outer film 1B may be frangible and the air in the air column may leak between the inner film 2B and the outer film 1B to lose air buffering performance. In addition, when the joint between the inner film 2B and outer film 1B being torn, the tearing at the joint of the inner film will lead to leaking of air through the entering channel between the inner films.

According to the present invention, due to the proximate end 211B of the first valve film 21B and the proximate end 231B of the strengthening film 23B are both heat-sealed together with the first cell film 11B, the joint strength is strengthened, so the air impermeability of the air bag packaging arrangement is further ensured.

In addition, distal end 232B of the strengthening film 23B and the distal end 211B of the first valve film 21B are heat-sealed together. Thus, after the inflating is finished, the air pressure acts on the strengthening film 23B to press the strengthening film 23B, the first valve film 21B and the second valve film 22B to the second cell film 12B, so that the four films are overlapped together to close the air entering channel 24B to prevent air leaking. Preferably, in similar with the strengthening film 23B and the first valve film 21B, the second valve film 22B has a proximate end 221B and a distal end 22B2B, proximate end 221B of the first valve film 22B and the second cell film 12B are heat-sealed together, the distal end 22B2B of the second valve film 22B, the distal end 332B of the strengthening film 23B and the distal end 212B of the first valve film 21B are connected to the second cell film 12B in the same heat-sealing manner, so that the first valve film 21B and second valve film 22B of the air valve 20B and the strengthening film 23B are able to face the same cell film, i.e. face and attach to the second cell film 12B in the preferred embodiment, so as to realize the sealing capability through air locking.

Figure 16:
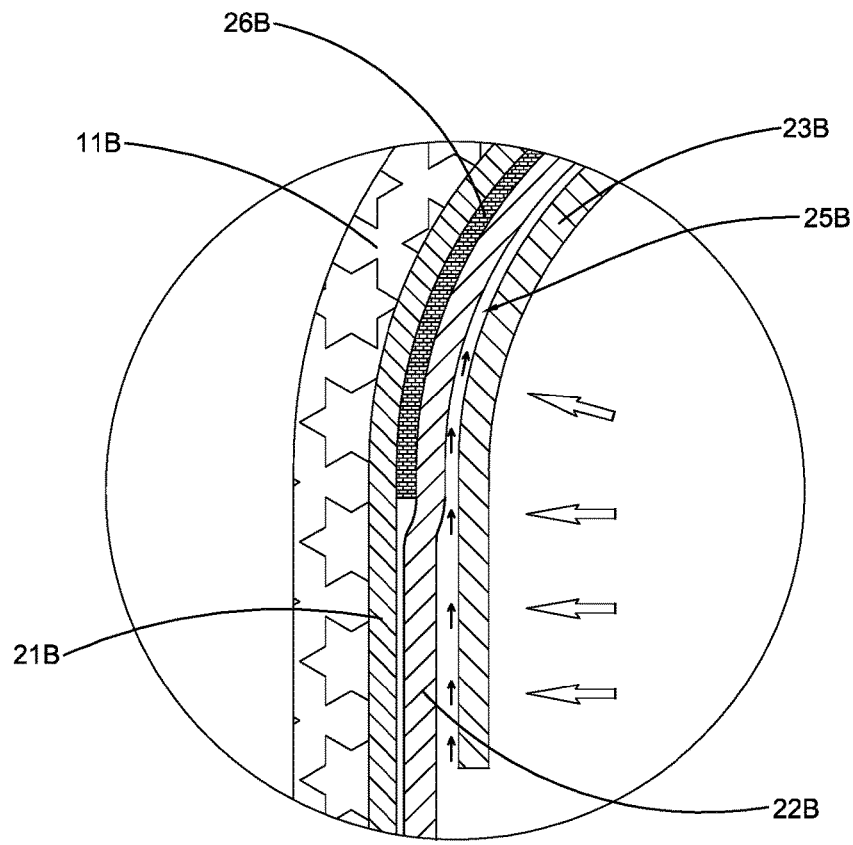
FIG. 16 is a partial enlarged view along line B-B line about A in FIG. 15B illustrating the air valve of the air bag packaging arrangement according to the above third preferred embodiment of the present invention.
Figure 17:
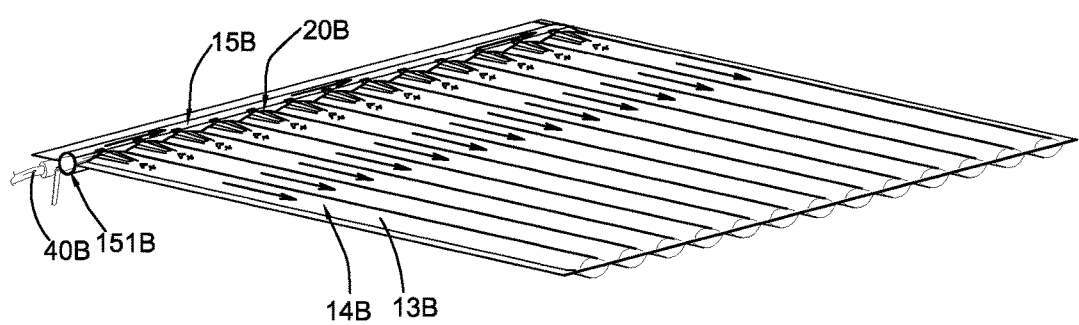
FIG. 17 illustrates the structure of the air bag packaging arrangement according to the above third preferred embodiment of the present invention during inflating.

According to this preferred embodiment of the present invention, a strengthening channel 25B, which is also embodied as a backflow prevention channel, is preferably formed between the strengthening film 23B and the first valve film 21B to enhance the air sealing performance. More specifically, as can be seen in FIG. 16, the air entering channel 24B is arranged to be used to fill air into the inflatable air chamber 14B and further inflate the inflatable unit 13B, till the distal end 212B of the first valve film 21B and the distal end 22B2B of the second valve film 22B overlap with each other and close the air entering channel 24B by means of the air pressure in the inflatable air chamber 14B. According to the present preferred embodiment of the present invention, if gas leaks, the gas will enter into the strengthening channel 25B through the gap between the distal end 232B of the strengthening film 23B and the distal end 22B2B of the first valve film 22B, so as to provide pressure supply and further seal the air entering channel 24B, so as to make up for the sealing effect of the first valve film 21B and the second valve film 22B. In other words, the air enter into the strengthening channel 25B will press the first valve film 21B and the second valve film 22B, so as to realize the sealing of the air entering channel 24B between the first valve film 21B and the second valve film 22B.

In this embodiment, the length of the strengthening film 23B can less than the length of the first valve film 21B and the length of the second valve film 22B, so when the strengthening film 23B overlaps to the proximate end of the first valve film 21B and the proximate end of the second valve film 22B, the proximate end 231B of the strengthening film 23B of the air valve 20B, the proximate end 211B of the first valve film 21B and the proximate end 221B of the second valve film 22B overlap together, the distal end 212B of the first valve film 21B and the distal end 222B of the second valve film 22B can overlap together, but the distal end 231B of the strengthening film 23B does not align with the distal end 212B of the first valve film 21B and the distal end 22B2B of the second valve film 22B. It is worth mentioning that the length of the strengthening film 23B is defined as the distance between the proximate end of the strengthening film 23B and the distal end of the strengthening film 23B. The length of the first valve film 21B is defined as the distance between the proximate end of the first valve film 21B and the distal end of the first valve film 21B. The length of the second valve film 22B is defined as the distance between the proximate end of the second valve film 22B and the distal end of the second valve film 22B.

As can be seen in FIG. 16, the strengthening channel 25B is formed between the strengthening film 23B and the first valve film 21B, wherein the strengthening channel 25B has an opening end facing the inflatable air chamber 14B and a closing end near the air entering opening 241B. In other words, the proximate end of the strengthening channel 25B is the closing end and the distal end of the strengthening channel 25B is the opening end.

It is worth mentioning that when air is inflated into the inflatable air chamber 14B through the air entering channel 24B, the flow direction of the air in the air entering channel 24B is opposite to the flow direction of the air in the strengthening channel 25B. Hence, the air will not be filled into the strengthening channel 25B. When the air leaks to the strengthening channel 25B from the inflatable air chamber 14B, the air enter into the strengthening channel 25B to provide a pressure supply and further seal the air entering channel 24B, so as to prevent the air entering channel 24B from leaking air.

Figure 15A:
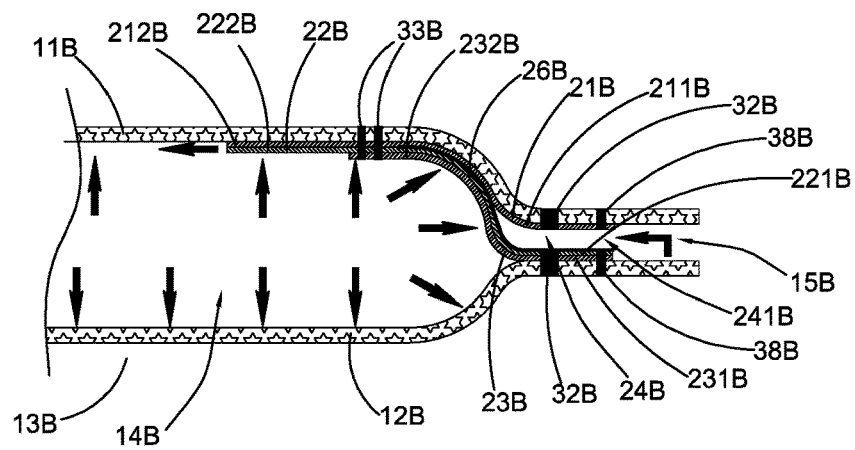
FIG. 15A is a sectional view along line A-A in FIG. 14 illustrating an air valve of the air bag packaging arrangement according to the above third preferred embodiment of the present invention.
Figure 15B:
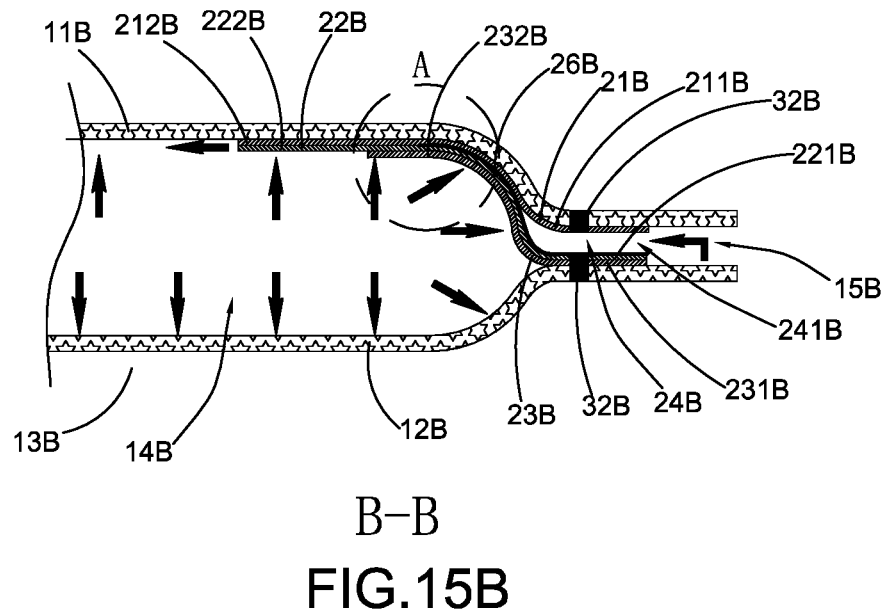
FIG. 15B is a sectional view along line B-B in FIG. 14 illustrating the air valve of the air bag packaging arrangement according to the above third preferred embodiment of the present invention.

The heat-sealing connection manner of the above five film will be described. As shown in FIGS. 15A, 15B and 16, the heat sealing seams 30 further comprises a sealing seam 32B which heat-seals the first cell film 11B, the strengthening film 23B and the proximate end 211B of the first valve film 21B together, wherein the sealing seam 32B heat-seals the second cell film 12B and the proximate end 221B of the second valve film 22B together. The sealing seam 32B can be formed in a single heat sealing process. The heat-sealing connection of the above five films can be realized via one single heat-sealing process with heat sealing molds. Of course, as required, one or more sealing seams 32B may be provided. It is worth mentioning that in heat-sealing technology, a heat-resisting separating layer 26B is provided near the proximate end of the first valve film 21B and second valve film 22B, so that the first valve film 21B and second valve film 22B will not be fully heat-sealed together via the heat-sealing of the sealing seam 32B. Due to the introduction of the heat-resisting separating layer 26B, the first valve film 21B and second valve film 22B will not be fully heat-sealed together, so that the air entering opening 241B will not be closed, so that the air entering channel 24B which is able to be used to inflating air is formed. The heat-resisting separating layer 26B can be taken out after the heat-sealing is finished. Or preferably, in the preferred embodiment, the heat-resisting separating layer 26B can be silicone oil, PVA, high temperature durable and sticking resisting ink, which is printed to the inner surface of the first valve film 21B or the second valve film 22B, for example, the heat-resisting separating layer 26B is printed to the inner surface of the first valve film 21B and face the second valve film 22B. The surface of the heat-resisting separating layer 26B need to be printed, for example, a predetermined corona treatment can be applied at the position having the high temperature durable and sticking resisting ink, so that the high temperature durable and sticking resisting ink can be stuck more steadily.

It is worth mentioning that the heat-resisting separating layer 26B does not need to extend to the distal end 212B of the first valve film 21B and the distal end 222B of the second valve film 22B. The first valve film 21B, the second valve film 22B and the strengthening film 23B are heat-sealed together at the relative distal ends via an air blocking seam 33B. The air blocking seam 33B further connects the distal end 212B, 222B and 232B of the first valve film 21B, second valve film 22B and the strengthening film 23B to the second cell film 12B and not connect with the first cell film 11B, so that when the pressure in the inflatable air chamber 14B reach a predetermined value, the pressing of the air makes the three films 21B, 22B and 23B of the air valve 20B attach to the second cell film 12B.

The shape of the air blocking seam 33B can be various, and an air blocking channel can be formed between the distal end 212B and 222B of the first valve film 21B and second valve film 22B, so that the air in the inflatable air chamber 14B will not easily round the air blocking seam 33B to enter the air entering channel 24B formed by the heat-resisting separating layer 26B (high temperature resistance material 26B). One skilled in the art will understand that the air blocking seam 33 are only set to area of the inflatable units 13B along the width direction, but not fully seal the inflatable units 13B along the width direction to help the air to enter into the inflatable units 13B.

The heat sealing seams 30 further comprises a plurality of side sealing seams 34B which are relatively provided to the two sides of each the air entering channel 24B, so that the second cell film 12B, the first valve film 21B, the second valve film 22B and the strengthening film 23B are heat-sealed together, so that the side wall of the air entering channel 24B is formed. The width of the air entering channel 24B is defined by the two side sealing seams 34B provided to each of the air entering channel 24B. More specifically, the two side sealing seams 34B can be two slant heat sealing line, so that the width of the air entering channel 24B decrease from the air entering opening 241B to the inflatable air chamber 14B. In other words, the near opening end of the air entering channel 24B is a bigger opening end, wherein the distal opening end of the air entering channel 24B is a taper opening end communicating with the inflatable air chamber 14B. The taper air entering channel 24B helps to avoid the air from leak to the air entering opening 241B from the inflatable air chamber 14B.

Figure 14:
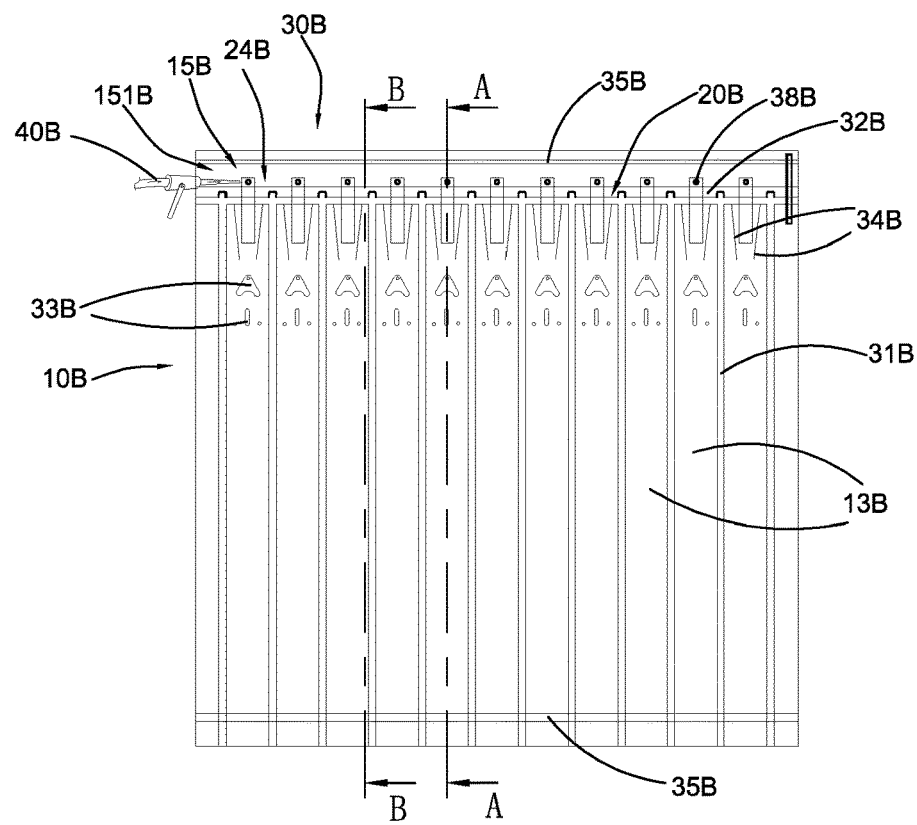
FIG. 14 is a schematic view of an air bag packaging arrangement according to a third preferred embodiment of the present invention.

As illustrated in FIGS. 14 and 15A, in the preferred embodiment, the first valve film 21B and the second valve film 22B extend into the main channel 15B formed by the first cell film 11B and the second cell film 12B, the air valve 20B is heat-sealed together with the first cell film 11B and the second cell film 12B via a connecting seam 38B. The connecting seam 38B can be formed via once heat-sealing, i.e. the two sides of the above five films are given a heat-sealing pressing operation via a hot-press mold, so that the first cell film 11B and the first valve film 21B are heat-sealed together via the connecting seam 38B, wherein the second valve film 22B, the second cell film 12B and the strengthening film 23B are heat-sealed together via the connecting seam 38B. The heat-resisting printing material 26B extends to parallel and level with the edge of the first valve film 21B and the second valve film 22B, so the first valve film 21B and second valve film 22B will not be heat-sealed together during the connecting seam 38B is being formed, so that the formation of the air entering opening 241B will not be affected, so that the main channel 15B and the air entering channel 24B communicate with each other. As shown in FIG. 14, the air bag packaging arrangement can comprise a series of the connecting seams 38B which are arranged in a dotted line, wherein each connecting seam 38B is located to the end of the heat-resisting printing material 26B.

Figure 15C:
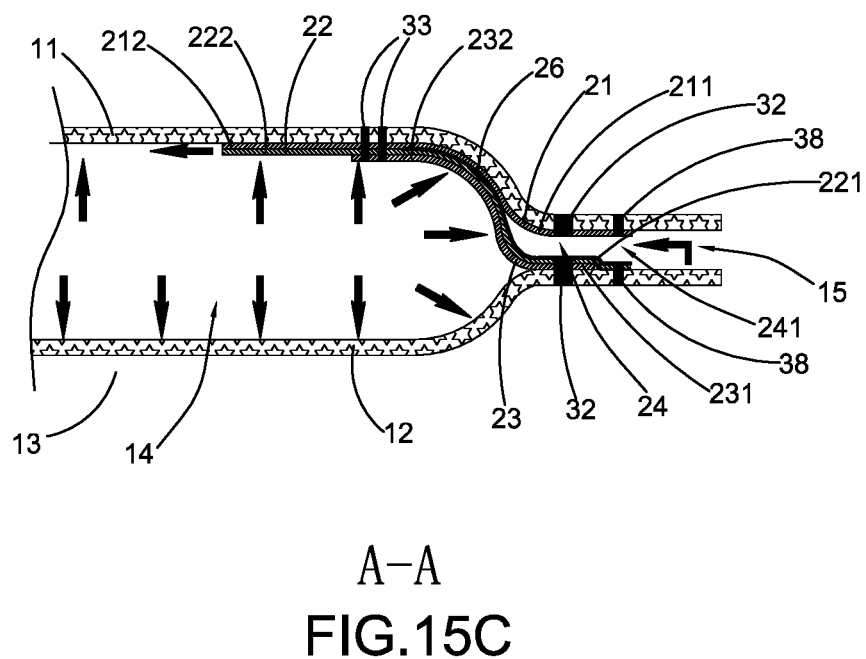
FIG. 15C is a sectional view of the air valve of the air bag packaging arrangement according to an alternative mode of the above third preferred embodiment of the present invention.

As shown in FIG. 15C, according to another embodiment, the strengthening film 23B may not extend into the main channel 15B, thus, the connecting seam 38B respectively heat-seals the first valve film 21B and the first cell film 11B, and heat-seals the second valve film 22B and the second cell film 12B. The strengthening film 23B makes the connection between the second valve film 22B and the second cell film 12B more secure.

It is worth mentioning that when air enters into the main channel 15B, the swelling of the main channel 15B will lead the first and second cell films 11B and 12B to pull the first valve film 21B and second valve film 22B to swell because of the connecting seam 38B, so the air entering opening 241B can be easily open.

To obtain the air bag packaging arrangement, the present invention also provide a manufacturing method, wherein the manufacturing method comprises the following steps: overlapping five films together, wherein the first film and the fifth film form the first cell film 11B and the second cell film 12B, wherein the third film and the fourth film form the first valve film 21B and the second valve film 22B, wherein the second film forms the strengthening film 23B, wherein the heat-resisting separating layer 26B is provided between the first valve film 21B and the second valve film 22B; forming the inflatable body 10B having one or more inflatable unit 13B which can be inflated and store air by the five films via heat-sealing, wherein the first cell film 11B, the strengthening film 23B and the proximate end 211B of the first valve film 21B are heat-sealed together by the sealing seam 32B, wherein the second cell film 12B and the proximate end 221B of the second valve film 22B are heat-sealed together by the sealing seam 32B, so that the air entering channel 24B is formed between the first valve film 21B and the second valve film 22B, wherein after the pressure in the inflatable air chamber 14B of the inflatable unit 13B reach a predetermined value, the first valve film 21B and second valve film 22B attach to the second cell film 12B to realize self-sealing, wherein the strengthening film 23B strengthen the connection strength between the first cell film 11B and the first valve film 21B to prevent the air leaking between the first cell film 11B and the first valve film 21B.

In this preferred embodiment, the manufacturing method may comprises the step of forming the inflatable units 13B side by side by the inflatable body 10B via the heat-sealing at the position of the dividing seal 31B, wherein each of the inflatable units 13B can have a relative air entering channel 24B, so the inflatable units 13B will not interfere with each other and can be inflated alone. The whole inflatable body 10B further has other border heat seal 35 et al, and form main channel 15B and air inflating opening 151B, wherein the main channel 15B amount to form an assigning channel. While inflating, the inflating mouth of the inflating device 40 enters into the air inflating opening 151B, wherein air enter into each of the air entering channels 24B from the main channel 15B through each air entering opening 241B and then enter into the inflatable air chamber 14B of the inflatable unit 13B. In addition, It is worth mentioning that in heat-sealing technology, the heat-sealing operation can be realized by a mold through once heat-sealing or be realized by different molds in a regular sequence.

Figure 19:
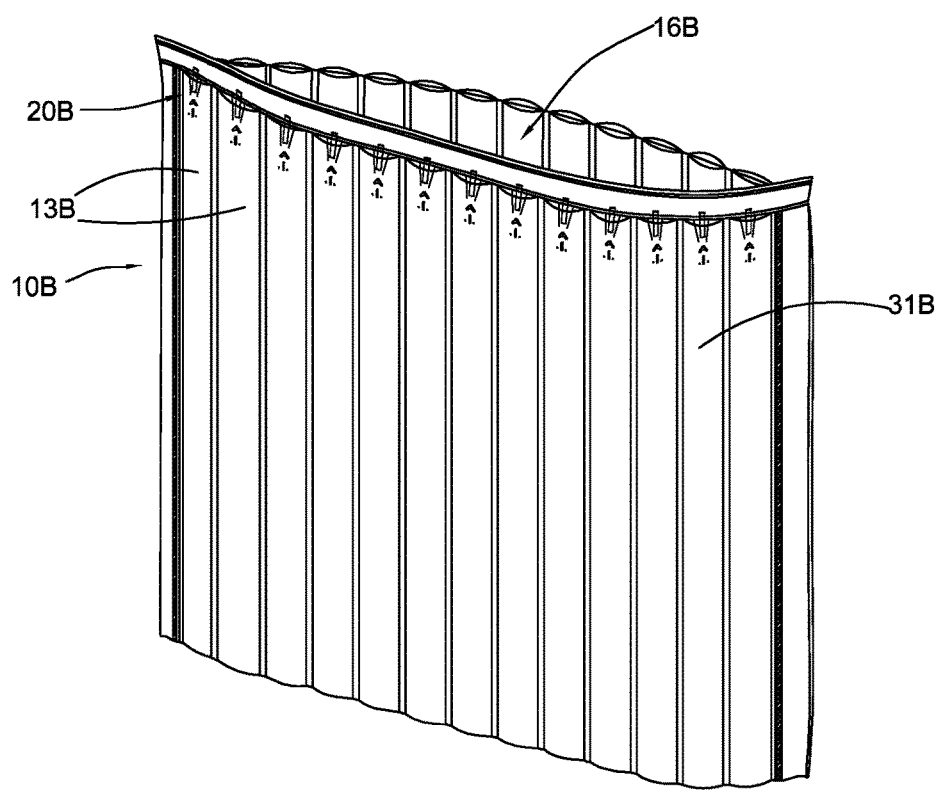
FIG. 19 is a perspective view of an air bag packaging arrangement according to a fourth preferred embodiment of the present invention.
Figure 20:
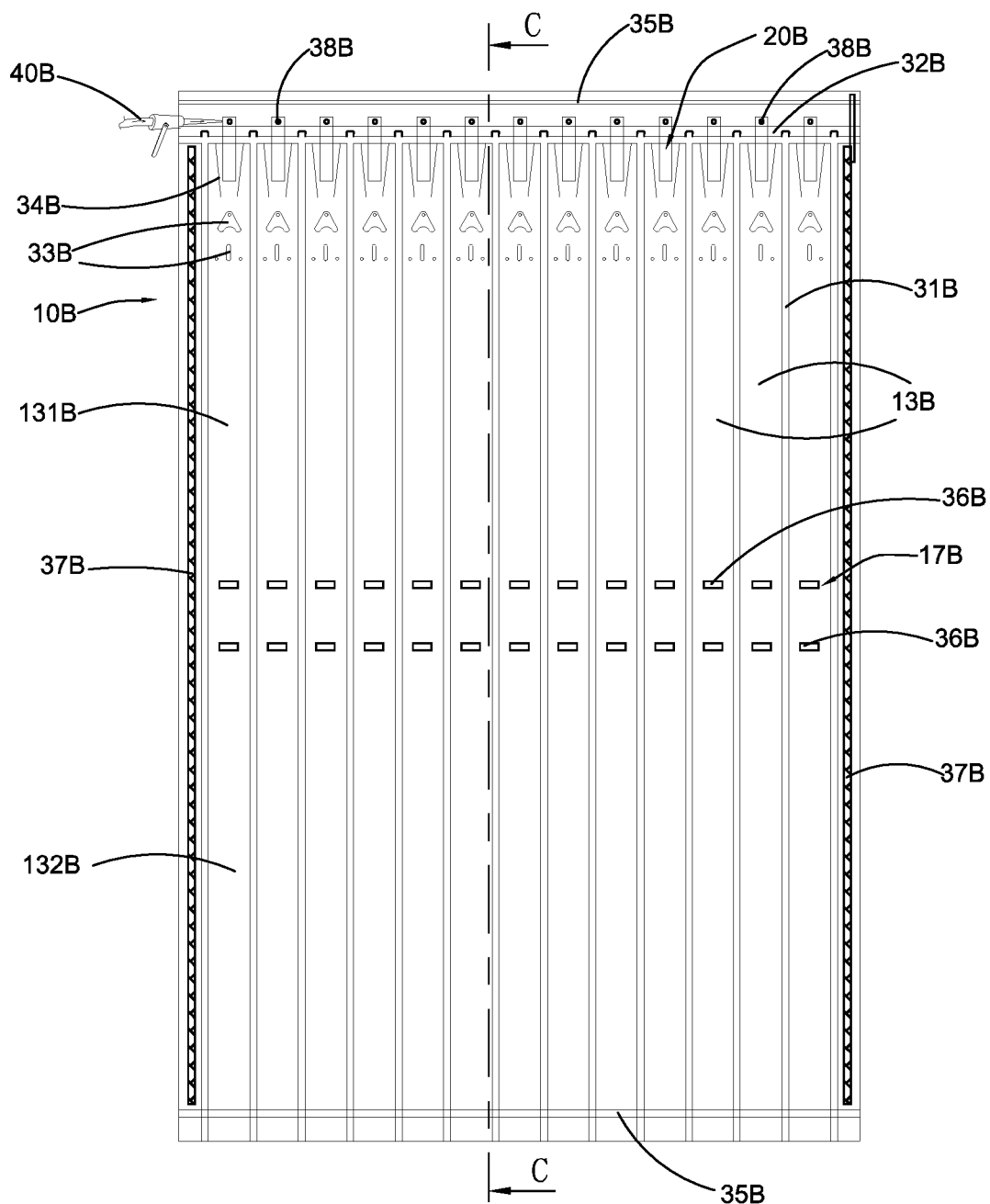
FIG. 20 illustrate the structure of the air bag packaging arrangement according to the above fourth preferred embodiment of the present invention, in an unfold position.
Figure 21:
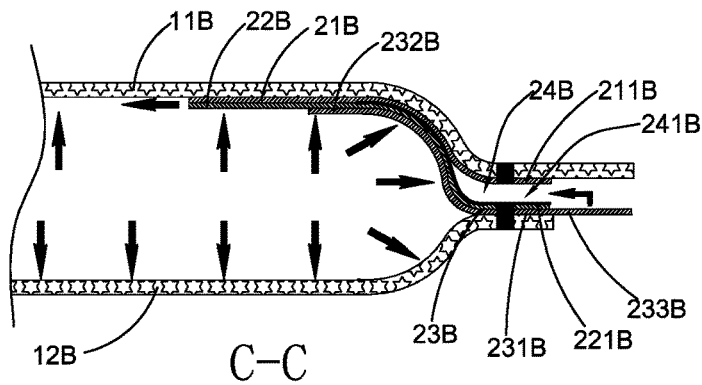
FIG. 21 is a sectional view along line A-A in FIG. 20 illustrating an air valve of the air bag packaging arrangement according to an alternative mode.

FIGS. 19 to 21 illustrate an air bag packaging arrangement and the air valve 20B thereof according to another preferred embodiment of the present invention. In the preferred embodiment, the air bag packaging arrangement is not only a filling material. The films is heat-sealed and bended to form a containing cavity 16B, wherein the packaged items can be directly contained to the containing cavity 16B, so that the air bag packaging arrangement will provide air cushioning effect around the packaged items, so the air bag packaging arrangement can be used as an air packaging bag. The shape and size of the air bag packaging arrangement can be designed according to the requirement.

More specifically, in similar, the air bag packaging arrangement further comprises the inflatable body 10B formed by the cell film 11B and 12B and the air valves 20B formed by the valve films 21B, 22B and 23B, wherein the air valves 20B are used to inflate to each inflatable unit 13B of the inflatable body 10B.

As shown in FIGS. 19 and 20, the air bag packaging arrangement can form a U-shaped packaging bag. One skilled in the art will understand that the embodiment is not the limitation to the present invention, one skilled in the art can design different air bags with the containing cavity 16B.

In the preferred embodiment, as can be seen in FIG. 21, the strengthening film 23B further comprises a strengthening extend portion 233B at the proximate end thereof, wherein the strengthening extend portion 233B extends to the proximate end 231B of the strengthening film 23B, thus, the main channel 15B is formed between the strengthening film 23B and the second cell film 12B. While inflating, air enters into the main channel 15B between the strengthening film 23B and the second cell film 12B and then enters into the inflatable air chamber 14B of each inflatable unit 13B corresponding to each air entering channel 24B.

Due to the strengthening film 23B has the strengthening extend portion 233B, the first cell film 11B can save some material. Thus, the strengthening extend portion 233B expose to the outside, but not between the cell film 11B and 12B. i.e. the proximate end of the first cell film 11B and the proximate end 231B and 211B of the strengthening film 23B and the first valve film 21B are heat-sealed together, but not extend to the strengthening extend portion 233B of the strengthening film 23B. The extend portion 233B of the strengthening film 23B overlaps with the proximate end of the second cell film 12B.

Figure 22:
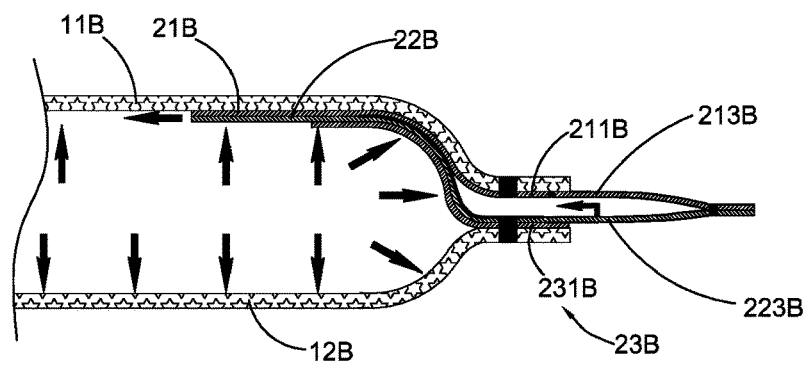
FIG. 22 is a sectional view of an air valve of the air bag packaging arrangement according to another alternative mode.

Each of the inflatable units 13B of the inflatable body 10B has a plurality of bending seams 36B, as shown in FIG. 22, each inflatable unit 13B can have two line of bending seams 36B, which divides each inflatable unit 13B to three sub-inflatable units 131B connecting and communicating with each other. It is worth mentioning that the positions of the bending seams 36B of the inflatable unit 11 are relative. In other words, the inflatable body 10B has two lines of bending seams 36B interval with each other, which are provided to the inflatable unit 13B in line but not continuous, so that an inflatable side wall is formed between two lines of the bending seams 36B, so that the packaging box having the air cushioning effect forms a plurality of air cushioning side walls, wherein these side walls are bended to define the containing cavity 16B, which is used to contain object. In other words, the inflatable body 10B has more than one lines of the bending seams 36B which are used to help bending, which can be arranged to be nodal lines interval with each other, so that the inflatable units 13B can be bended along these bending seams 36B, so that these sub-inflatable unit 131B of the inflatable body 10B respectively form a plurality of air cushioning side wall. One skilled in the art will understand that the quantity of the bending seams 36B of the inflatable body 10B can be designed to obtain and ideal amount of the air cushioning side walls.

Furthermore, each bending seam 36B is provided to the middle of the relative inflatable unit 13B and has a predetermined interval with the two adjacent dividing seams 31 B, so that the communicating channel 17B between the two the sub-inflatable units 13B1 is formed. Thus, during inflating, when air enters into each inflatable unit 13B from each air entering channel 24B, the air can be distributed to each of the sub-inflatable units 131B of a same inflatable unit 13B. In addition, the bending seam 36B may not be provided to the middle position of the relative inflatable unit 13B but are provided to be the sides of the inflatable unit 13B and may connect with the dividing seam 31B and the communicating channel 17B is form in the middle of the inflatable unit 13B.

In addition, in the preferred embodiment, after the inflatable body 10B being bended along two lines of the bending seams 36B, the inflating side wall between two list of the bending seals 36B forms a bottom side wall, wherein the two sides of the bottom side wall respectively form a front side wall and a rear side wall, the front side wall and the rear side wall are further heat-sealed by the end seals 37B in two sides, so that the two sides of the inflatable body 10B are heat-sealed together, so that the containing cavity 16B with an open end is formed. It is understandable that the end seal 37B can be continuous heat seal or interval heat seal. The end seal 37B can be provided to the outboard dividing seal 31B of the inflatable body 10B. The outboard dividing seal 31B and the end seal 37B can be heat-sealed together. Also, the end seal 37B can be another heat seal differ with the dividing seal 31B.

The air bag packaging arrangement can be used alone to provide air cushioning effect for the packaged items. The air bag packaging arrangement can be used with other packaging arrangement, such as packaging box, i. e. the packaging items are put into the containing cavity 16B of the air bag packaging arrangement, then the air bag packaging arrangement carrying the packaging items is put into another packaging box, so that the packaging items is further protected, so as to provide more convenience to the storage and transportation of the packaging items.

FIG. 22 illustrates the air bag packaging arrangement and the air valve thereof according to another alternative mode of the present invention. In this embodiment, wherein the first valve film 21B and the second valve film 22B of the air valve 20B further comprises an outer extending portion 213B and an outer extending portion 223B respectively extend from the proximate end 211B and 221B. The main channel 15B can be formed between the outer extending portion 213B and 223B, so that the length of the first cell film 11B and the second cell 12B are decreased.

Figure 12:
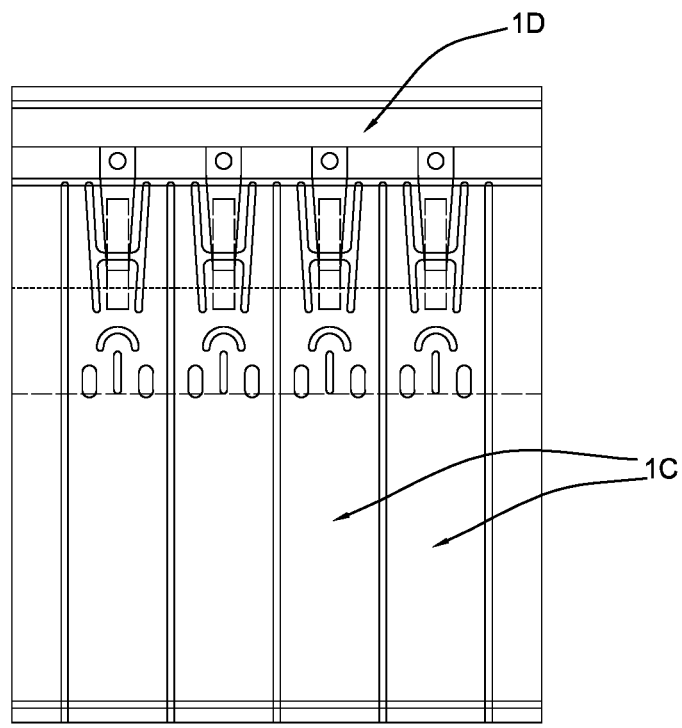
FIG. 12 is a partial diagram of an air bag packaging arrangement according to the prior art.
Figure 13:
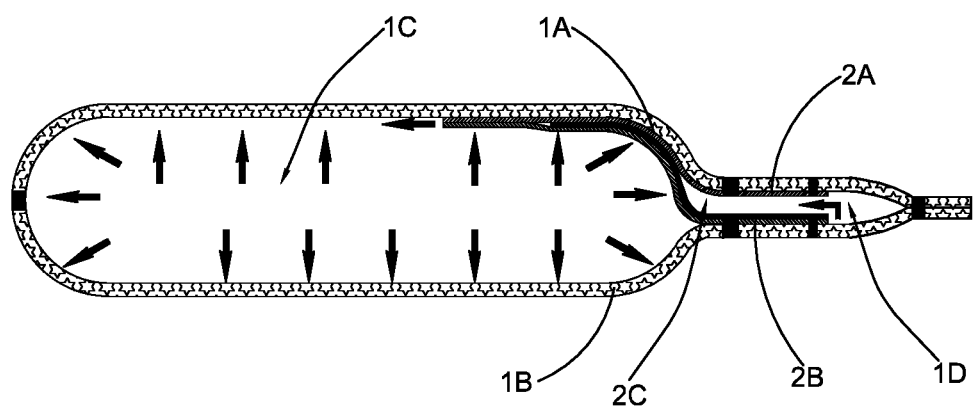
FIG. 13 is a sectional diagram of an air valve of the air bag packaging arrangement according to the prior art.

According to the preferred embodiment of the present invention, during inflating to each inflatable air chamber 14B, air will only be assigned in the space between the valve films 21B and 22B, air will not enter into the main channel 1D between the outer films 1A and 1B and then enter into an inflating channel 2C according to the prior art as illustrated in FIGS. 12 and 13. According to the present invention, air will only enter into the space between the valve films 21B and 22B and will not be affected by the two cell films 11B and 12B and will not enter into the space between one of the valve films and one of the cell films, so as to ensure the smooth of the inflating.

More specifically, according to the preferred embodiment of the present invention, unlike the prior art as illustrated in FIGS. 12 and 13, two inner films 2A and 2B are fully provided between the two outer films 1A and 1B. The valve films 21B and 22B of the air valve 20B according to the present invention only partly overlap with the cell films 11B and 12B. As can be seen in FIG. 22, the first valve film 21B and the first cell film 11B overlap with each other partially, wherein the second valve film 22B and the second cell film 12B overlap with each other partially.

In other words, according to the present invention, the cell films 11B and 12B don't extend to the main channel 15B, but overlap at a local position of the air valve 20B and are heat-sealed together. Due to the two sides of the main channel 15B respectively have one of the outer extending portions 213B and 223B. While inflating, after air enter into the main channel 15B, the outer extending portion 213B and 223 of the valve film 21B and 22B will swell easily, so that the air entering channel 24B communicating with the inflatable unit 13B will be open.

It is worth mentioning that according to the preferred embodiment of the present invention, the two valve films 21B and 22B of the air valve 20B can be independent films which overlap with each other and be heat-sealed to form the main channel 15B and the air entering channel 24B. One skilled in the art will understand that the air valve 20B can also be formed via folding a whole film. According to all of the above preferred embodiment, the cell films 11B and 12B can be independent films or can be formed via folding a whole film.

Figure 23:
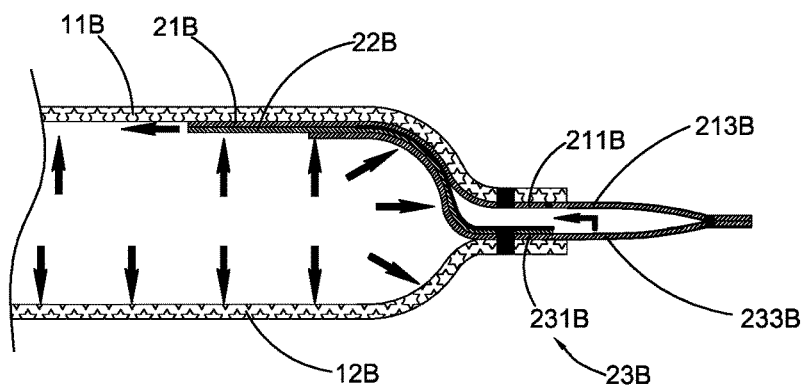
FIG. 23 is a sectional view of an air valve of the air bag packaging arrangement according to another alternative mode.

In addition, as illustrated in FIG. 23, the main channel 15B can be formed between the strengthening film 23B and the second valve film 22B. Thus, the first valve film 21B will not need to expose outside, so as to save materials. i. e. the strengthening film 23B comprises the strengthening extending portion 231B, wherein the second valve film 22B comprises the outer extending portion 223B, wherein the main channel 15B is formed between the strengthening extending portion 231B of the strengthening film 23B and the outer extending portion 223B of the second valve film 22B, so as to ensure the smooth of inflating.

It is worth mentioning that according to the embodiment as illustrated in FIGS. 21 to 23, unlike the prior art as illustrated in FIGS. 12 and 13, air will first enter into the main channel 1D between the two outer films 1A and 1B and then enter into the inflating channel 2C. Unlike the prior art, according to the prior art, the air valve films 2A and 2B are both in the position between the two outer films 1A and 1B. According to the present invention, at least one film of the air valve 20B extends to the outer side of the cell films 11B and 12B and forms the main channel 15B. Each of the connecting seam 38B which is used to easily open the air entering opening 241B between the first valve film 21B and the second valve film 22B, as illustrated in the first preferred embodiment, is not necessary.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An air valve, which is suitable to inflate an air bag packaging arrangement comprising an inflatable body and one or more air blocking seams, wherein the inflatable body comprises two cell films overlapping with each other to form at least one inflatable unit, wherein each said inflatable unit has an inflatable air chamber, wherein said air valve comprises two valve films overlapping with each other and a strengthening film, wherein said two valve films, said strengthening film and said two cell films are sealed, so as to form at least one air entering channel between said two valve films, which is used to inflate said inflatable air chamber, wherein after an inflating process is finished, said first and second valve films attach to one of said two cell films, so as to close said at least one air entering channel, wherein said strengthening film is provided between the other said cell film and one of said two valve films, wherein said one or more air blocking seams connect said two valve films, wherein said one or more air blocking seams prevent air in said inflatable air chamber from reversing through said at least one air entering channel.

2. The air valve, as recited in claim 1, wherein said one or more air blocking seams further connect said strengthening film with said second cell film.

3. The air valve, as recited in claim 1, wherein a strengthening channel is formed between said strengthening film and said first valve film, so as to further strengthen a sealing effect of said at least one air entering channel between said first valve film and said second valve film after the inflating process is finished.

* * * * *